(12) United States Patent
Gong et al.

(10) Patent No.: US 10,536,406 B2
(45) Date of Patent: Jan. 14, 2020

(54) DATA TRANSMISSION METHOD AND APPARATUS, AND IN-VEHICLE TERMINAL

(71) Applicant: TENCENT TECHNOLOGY (SHENZHEN) COMPANY LIMITED, Shenzhen (CN)

(72) Inventors: You Gong, Shenzhen (CN); Zhaolong Li, Shenzhen (CN); Fei Cao, Shenzhen (CN); Dongqing Cao, Shenzhen (CN); Feng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/953,205

(22) Filed: Apr. 13, 2018

(65) Prior Publication Data
US 2018/0234364 A1 Aug. 16, 2018

Related U.S. Application Data

(63) Continuation of application No. PCT/CN2017/071827, filed on Jan. 20, 2017.

(30) Foreign Application Priority Data

Jan. 22, 2016 (CN) .......................... 2016 1 0047725

(51) Int. Cl.
*H04L 12/58* (2006.01)
*H04W 76/10* (2018.01)
(Continued)

(52) U.S. Cl.
CPC ............ *H04L 51/046* (2013.01); *H04L 51/18* (2013.01); *H04W 4/12* (2013.01); *H04W 4/40* (2018.02); *H04W 76/10* (2018.02)

(58) Field of Classification Search
CPC ......... H04W 4/12; H04W 4/40; H04W 76/10; H04L 51/18; H04L 51/046
See application file for complete search history.

(56) References Cited

U.S. PATENT DOCUMENTS 7,519,667 B1 * 4/2009 Capps ................... H04L 51/046
 709/203
2007/0203917 A1 * 8/2007 Du .......................... H04L 29/06
(Continued)

FOREIGN PATENT DOCUMENTS

CN 102149014 A 8/2011
CN 102694830 A 9/2012
(Continued)

OTHER PUBLICATIONS

The World Intellectual Property Organization (WIPO) International Search Report for PCT/CN2017/071827 dated Apr. 11, 2017 5 Pages (including translation).
(Continued)

*Primary Examiner* — Azizul Choudhury
(74) *Attorney, Agent, or Firm* — Anova Law Group, PLLC

(57) ABSTRACT

Embodiments of the present invention disclose a data transmission method and apparatus, and an in-vehicle terminal. The data transmission method includes: obtaining, by a first terminal, transmission data by using a first application, the transmission data being data corresponding to a to-be-played file; obtaining, by the first terminal, an address of a first server by using the first application, the first server being a server configured to provide an online play service to a second terminal; and according to the address of the first server, sending, by the first terminal using the first applica-
(Continued)

tion, the transmission data to the first server by using a second server, the second server being a server of the first application.

18 Claims, 10 Drawing Sheets

(51) Int. Cl.
*H04W 4/40* (2018.01)
*H04W 4/12* (2009.01)

(56) References Cited

U.S. PATENT DOCUMENTS

2009/0089293 A1* 4/2009 Garritano .............. G06F 16/358
2012/0260348 A1 10/2012 Woodruff

FOREIGN PATENT DOCUMENTS

| CN | 102724309 A | 10/2012 |
| CN | 103338263 A | 10/2013 |
| CN | 103716339 A | 4/2014 |
| CN | 104052762 A | 9/2014 |
| CN | 104797001 A | 7/2015 |
| CN | 105577818 A | 5/2016 |

OTHER PUBLICATIONS

The State Intellectual Property Office of the People's Republic of China (SIPO) Office Action 1 for 201610047725.5 dated Mar. 26, 2018 8 Pages (including translation).
The State Intellectual Property Office of the People's Republic of China (SIPO) Office Action 2 for 201610047725.5 dated Nov. 2, 2018 9 Pages (including translation).
Haifeng Hunag, "The car networking market is still in the "prince dispute" period Tencent wants to win the car open platform", Communication World, Sep. 25, 2015, p. 54 2 Pages (including translation).

* cited by examiner

DATA TRANSMISSION METHOD AND APPARATUS, AND IN-VEHICLE TERMINAL

CROSS-REFERENCES TO RELATED APPLICATIONS

This application is a continuation application of PCT Patent Application No. PCT/CN2017/071827, filed on Jan. 20, 2017, which claims priority to Chinese Patent Application No. 201610047725.5, filed with the Chinese Patent Office on Jan. 22, 2016 and entitled "DATA TRANSMISSION METHOD AND APPARATUS, AND IN-VEHICLE TERMINAL", which is incorporated herein by reference in its entirety.

FIELD OF THE TECHNOLOGY

The present disclosure relates to the field of Internet technologies and, in particular, to a data transmission method and apparatus, and an in-vehicle terminal.

BACKGROUND

Currently, data sharing between client-ends may be implemented by establishing a connection channel between the client-ends, and performing data transmission between the client-ends by using the connection channel. Data transmission between client-ends may be implemented by using a universal serial bus (USB) data line. For example, an intelligent mobile terminal establishes a connection channel by connecting a USB data line to an in-vehicle infotainment system, and data of a client-end in the intelligent mobile terminal is transmitted to a client-end of the in-vehicle infotainment system by using the USB data line. After the intelligent mobile terminal downloads a complete to-be-played file (for example, a to-be-played file of an audio type) from a network, the client-end of the intelligent mobile terminal transmits transmission data of the to-be-played file to the client-end of the in-vehicle infotainment system by using the USB data line. The client-end of the in-vehicle infotainment system receives the transmission data of the to-be-played file, and plays the audio type file according to the transmission data of the to-be-played file. According to this method, a formal connection needs to be established. Data can be transmitted between terminals corresponding to client-ends only when the connection is successful. Therefore, a transmission process is long. When the USB data line is damaged, or the length of the USB data length is insufficient, the terminals corresponding to the client-ends cannot be connected. Consequently, data transmission between the client-ends cannot be performed.

Alternatively, the data transmission between the client-ends may be implemented by using a Bluetooth connection. For example, before data is transmitted between a client-end of a mobile communications terminal and a client-end of an in-vehicle infotainment system, the mobile communications terminal and the in-vehicle infotainment system need to enable a Bluetooth function. Only when the mobile communications terminal and the in-vehicle infotainment system satisfy the standard of the Bluetooth Special Interest Group, a connection channel between the client-end of the mobile communications terminal and the client-end of the in-vehicle infotainment system can be established. A to-be-played file of the mobile communications terminal is transmitted to the in-vehicle infotainment system by using a Bluetooth transmission protocol for play. The Bluetooth is a wireless technology standard. By means of the Bluetooth, only data exchange within a short distance can be implemented, and a transmission process is relatively long. Only when client-ends satisfy the standard of the Bluetooth Special Interest Group, a connection can be established. When client-ends do not satisfy the standard of the Bluetooth Special Interest Group, or a distance between client-ends is relatively long, it is difficult to implement data transmission between the client-ends.

SUMMARY

Embodiments of the present invention provides a data transmission method and apparatus, and an in-vehicle terminal, so as to resolve at least the foregoing technical problem that the data transmission process is relatively long.

According to an aspect of the present disclosure, a data transmission method is provided. The data transmission method includes: obtaining, by a first terminal, transmission data by using a first application, the transmission data being data corresponding to a to-be-played file; obtaining, by the first terminal, an address of a first server by using the first application, the first server being a server configured to provide an online play service to a second terminal; and according to the address of the first server, sending, by the first terminal using the first application, the transmission data to the first server by using a second server, the second server being a server of the first application.

According to another aspect of the present disclosure, a non-transitory computer-readable storage medium is provided. The non-transitory computer-readable storage medium contains computer-executable instructions for, when executed by one or more processors, performing a data transmission method. The data transmission method includes: obtaining transmission data by using a first application on a first terminal, the transmission data being data corresponding to a to-be-played file; obtaining an address of a first server by using the first application, the first server being a server configured to provide an online play service to a second terminal; and according to the address of the first server, sending, by using the first application, the transmission data to the first server by using a second server, the second server being a server of the first application.

Other aspects of the present disclosure can be understood by those skilled in the art in light of the description, the claims, and the drawings of the present disclosure.

BRIEF DESCRIPTION OF THE DRAWINGS

The accompanying drawings described herein are intended to provide further understanding of the present disclosure and constitute a part of this application. Exemplary embodiments of the present invention and descriptions thereof are used to explain the present disclosure, and do not constitute any inappropriate limitation to the present disclosure. In the accompanying drawings.

DETAILED DESCRIPTION

To make a person skilled in the art understand the solutions in the present disclosure better, the following describes the technical solutions in the embodiments of the present invention with reference to the accompanying drawings. Apparently, the described embodiments are merely some rather than all the embodiments of the present invention. All other embodiments obtained by a person of ordinary skill in the art based on the embodiments of the present invention without creative efforts shall fall within the protection scope of the present disclosure.

It should be noted that in the specification, claims, and accompanying drawings of the present disclosure, the terms "first", "second", and so on are intended to distinguish between similar objects rather than describe a specific order. It should be understood that the terms used in such a way are interchangeable in proper circumstances, so that the embodiments of the present invention described herein can be implemented in orders except the order illustrated or described herein. In addition, the terms "include", "have", and any variants thereof are intended to cover a non-exclusive inclusion. For example, a process, method, system, product, or device that includes a series of steps or units is not necessarily limited to those steps or units specified expressly, but may include other steps or units not specified expressly or inherent to such a process, method, system, product, or device.

It should be noted that the steps shown in the flow chart of the accompany drawings may be performed in, for example, a computer system including a set of computer executable instructions. In addition, although a logic order is shown in the flow chart, in some cases, the shown or described steps may be performed in an order different from the order herein.

Figure 1:
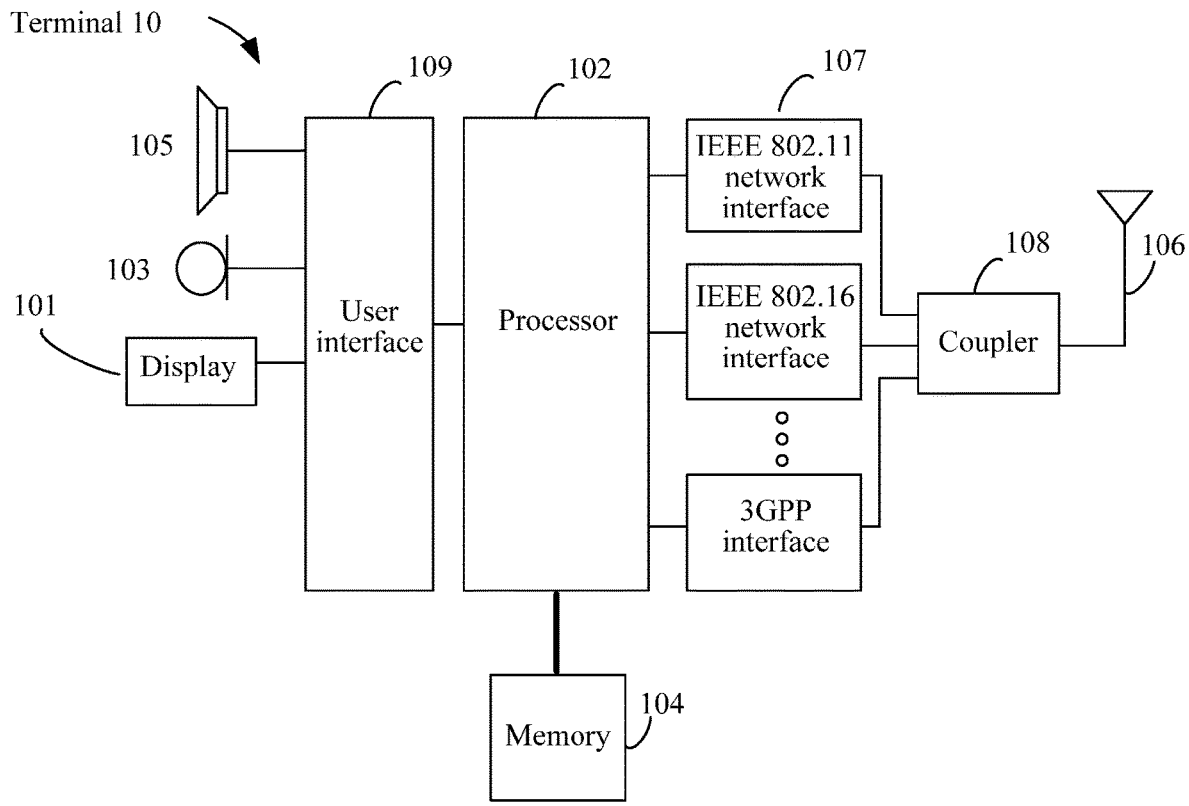
FIG. 1 is a structural block diagram of hardware of a terminal according to an embodiment of the present invention.

FIG. 1 is a structural block diagram of hardware of a terminal 10 according to an embodiment of the present invention. The terminal 10 may perform data transmission methods of embodiments of the present invention. The terminal 10 may be a mobile terminal, a computer terminal, or another computing apparatus. For example, the terminal 10 may be a terminal device such as a smartphone, a tablet computer, a palmtop computer, a mobile Internet device (MID), or a PAD, etc. The terminal 10 may alternatively be an in-vehicle terminal.

As shown in FIG. 1, the terminal 10 may include one or more (only one is shown in the figure) processors 102 (the processor 102 may include, but is not limited to, a processing apparatus such as a micro control unit (MCU) or a field programmable gate array (FPGA)), a memory 104 configured to store data, and a transmission module 106 (such as an antenna) used for a communication function. The terminal 10 may further include: a display 101, a microphone 103, a loudspeaker 105, a coupler 108, and a user interface 109. The terminal 10 may further include an IEEE 802.11 network interface, an IEEE 802.16 network interface, and a 3GPP interface 107. A person of ordinary skill in the art may understand that the structure shown in FIG. 1 is only for the purpose of illustration, and do not constitute any limitation to the foregoing electronic apparatus. For example, the terminal 10 may alternatively include more or fewer components than those shown in FIG. 1, or have a configuration different from that shown in FIG. 1.

The memory 104 may be configured to store a software program and module of application software, for example, program instructions/modules of the data transmission method in the embodiments of the present invention. The processor 102 runs the software program and modules stored in the memory 104, to implement various functional applications and data processing, that is, implement the data transmission method. The memory 104 may include a high-speed random-access memory, and may further include a non-volatile memory, for example, one or more magnetic storage devices, flash memories or other non-volatile solid-state memories. In some embodiments, the memory 104 may further include memories remotely disposed relative to the processor 102, and these remote memories may be connected to the terminal 10 by using a network. Examples of the network include, but are not limited to, the Internet, an intranet, a local area network, a mobile communications network, or a combination thereof.

The transmission apparatus 106 is configured to receive or send data by using one network. A specific example of the network may include a wireless network provided by a communications provider of the terminal 10. In an example, the transmission apparatus 106 includes a network adapter (NIC). The NIC may be connected to another network device by using a base station, so as to communicate with the Internet. In an example, the transmission apparatus 106 may be a radio frequency (RF) module, and is configured to communicate with the Internet in a wireless manner.

The IEEE 802.11 network interface, the IEEE 802.16 network interface, and the 3GPP interface 107 are connected to the coupler 108, and the coupler 108 is connected to the antenna 106.

The user interface 109 is configured to connect to the processor 102, the display 101, the microphone 103, and the loudspeaker 105.

An embodiment of the present invention provides a data transmission method. The data transmission method includes: obtaining, by a first terminal, transmission data by using a first application, the transmission data being data corresponding to a to-be-played file; obtaining, by the first terminal, an address of a first server by using the first application, the first server being a server configured to provide an online play service to a second terminal; and sending according to the address of the first server, by the first terminal using the first application, the transmission data to the first server by using a second server, the second server being a server of the first application.

Figure 2:
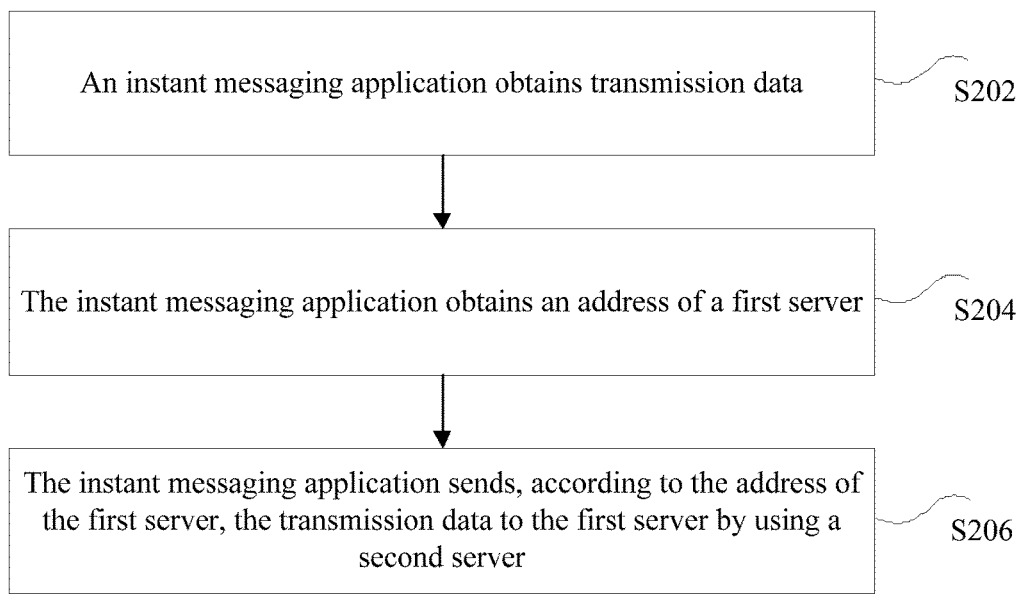
FIG. 2 is a flowchart of a data transmission method according to an embodiment of the present invention.

FIG. 2 is a flowchart of a data transmission method according to an embodiment of the present invention. The data transmission method may be applied to the terminal 10 shown in FIG. 1 and is performed by the processor in the terminal. The terminal device may be an intelligent mobile communications terminal such as a smartphone or a tablet computer.

A first application and a second application may be installed on the terminal device. An example of the first application is an instant messaging application. The terminal may be connected to a server of the instant messaging application by using a network. Examples of the second application are a media play application and a navigation application. The media play application may include an audio type application program or a video type application program. This embodiment of the present invention is described below by using the instant messaging application and the media play application and/or the navigation application as an example, and a person skilled in the art may understand that the present disclosure is not limited thereto. In addition, a person skilled in the art may understand that the first application and the second application may be installed on a same terminal, or may be installed on different terminals that are connected by using a network.

This embodiment of the present invention does not limit any particular type of the instant messaging application, which may be a system type application program, or may be a software type application program. The instant messaging application in one embodiment of the present invention includes at least one application function. For example, the instant messaging application is WeChat. WeChat includes application functions such as obtaining and sharing an address link, selecting a friend, or sending a message.

As shown in FIG. 2, a data transmission method may include the followings.

S202: An instant messaging application obtains transmission data.

A terminal may obtain the transmission data by using the instant messaging application installed on the terminal. The terminal is also referred to as a first terminal for distinguishing from a second terminal below.

The instant messaging application is an application program that implements online communication by using an instant messaging application technology, and is configured to transfer information such as text information, audio information, and video information, thereby implementing text information communication and multimedia communication. For example, the instant messaging application is QQ or WeChat, or other instant messaging applications.

In the embodiment, the transmission data is data corresponding to a to-be-played file, and the transmission data needs to be transmitted from the instant messaging application to another client-end. An example of the data corresponding to the to-be-played file is a web page link address of the to-be-played file that is stored in a message form. The to-be-played file may be an audio or a video type file, so that the transmission data is data corresponding to the audio or video type file. Optionally, the data corresponding to the audio or video type file is a web page link address of the audio or video type file that is stored in a message form. The to-be-played file may be a navigation type file, so that the transmission data is data corresponding to the navigation type file. Optionally, the data corresponding to the navigation type file is a web page link address of the navigation type file that is stored in a message form. The to-be-played file may be played on a target client-end.

The target client-end is also referred to as the second terminal in the specification. A structure of the second terminal may be the same as that of the terminal 10 shown in FIG. 1.

The instant messaging application obtains the transmission data, that is, the instant messaging application obtains the data corresponding to the to-be-played file. The transmission data may be generated by using a relevant application program (that is, the second application) installed on an intelligent mobile communications terminal. The application program installed on the intelligent mobile communications terminal may be a media play application program (for example, an audio type application program or a video type application program), or may be a navigation type application program, and the application program installed on the intelligent mobile communications terminal has a data sharing function. When the intelligent mobile communications terminal is connected to a network, the application program installed on the intelligent mobile communications terminal may download, by using the network, the to-be-played file corresponding to the transmission data. The application program installed on the intelligent mobile communications terminal may send the transmission data corresponding to the to-be-played file to the instant messaging application. For example, the application program installed on the intelligent mobile communications terminal is QQMusic application program, transmission data of a song is determined by using QQMusic application program, and the transmission data of the song is sent to the instant messaging application by using a sharing function of QQMusic application program, so that the instant messaging application obtains the transmission data of the song.

The instant messaging application in one embodiment of the present invention obtains the transmission data. The transmission data is the data corresponding to the to-be-played file, and the to-be-played file is a file to be played on the target client-end. Therefore, the instant messaging application obtains the transmission data.

S204: The instant messaging application obtains an address of a first server. The first terminal may obtain the address of the first server by using the instant messaging application installed on the first terminal. The first server may be a cloud server. The first server is a server configured to provide an online play service to the target client-end, and is a simple, high-efficiency, and reliable apparatus whose processing capability may be flexible. Optionally, the first server may be in a one-to-one correspondence with the target client-end. The first server may send the transmission data to the target client-end by using a network, and may store a result of transmission data processing performed by the target client-end, thereby implementing that the target client-end performs online play on the to-be-played file. For example, the target client-end is an in-vehicle terminal, and the first server is a cloud server corresponding to the in-vehicle terminal, that is, the first server is the cloud server of the Internet of Vehicles. The cloud server of the Internet of Vehicles may send the transmission data to the in-vehicle terminal by using a network, and stores a result of transmission data processing performed by the in-vehicle terminal.

The first server has an address, and the address is specifically a protocol address of the Internet and is unique. The address is used for identifying the first server. The instant messaging application obtains the address of the first server. Optionally, the instant messaging application receives a touch control signal for the address of the first server, and obtains the address of the first server according to the touch control signal, so that a transmission target of the transmission data is determined. For example, the instant messaging application is WeChat application. A user terminal adds a vehicle of the user as a friend, and "My car" is the vehicle of the user terminal. That is, the vehicle is added as a friend of the user of the first terminal in WeChat. An application icon "My car" is selected from an interface of WeChat application. After the application icon "My car" receives the touch control signal, WeChat application obtains an address of a cloud server of the Internet of Vehicles by using a network, so that the cloud server of the Internet of Vehicles through which WeChat application transmits data is determined.

The instant messaging application in one embodiment of the present invention obtains the address of the first server. The first server is a server configured to provide the online play service to the target client-end, so as to determine the transmission target of the transmission data obtained by the instant messaging application.

S206: The instant messaging application sends, according to the address of the first server, the transmission data to the first server by using a second server.

The first terminal may send according to the address of the first server, by using the instant messaging application, the transmission data to the first server by using the second server. The second server may be a cloud server, for example, a cloud server of the instant messaging application. The second server varies depending on different types of instant messaging applications. For example, when the instant messaging application is WeChat application, the second server is a cloud server of WeChat and is configured to: receive, calculate, process, and send relevant data of WeChat application. When the instant messaging application is QQ application program, the second server is a cloud server of QQ and is configured to: receive, calculate, process, and send relevant data of QQ application. The instant messaging application may transmit the transmission data to the second server by using a network (for example, a wireless network), then the second server transmits the transmission data to the first server, and finally, the first server transmits the transmission data to the target client-end. After the instant messaging application obtains the transmission data and the instant messaging application obtains the address of the first server by using the network, the instant messaging application sends, according to the address of the first server, the transmission data to the first server by using the second server. After the first server receives the transmission data, the first server sends the transmission data to the target client-end by using the network, thereby implementing transmission of the transmission data of the to-be-played file. When the network is a wireless network, wireless transmission of the transmission data of the to-be-played file may be implemented. After the target client-end receives the transmission data, the target client-end performs online play on the to-be-played file corresponding to the transmission data by using the network (for example, the wireless network), thereby immediately playing the to-be-played file and simplifying a data transmission process.

For example, when the to-be-played file is an audio type file, the target client-end performs online play on the audio type file according to transmission data of the audio type file, so that when there is a network, a terminal user immediately listens sound of the audio type file. When the to-be-played file is a navigation type file, the target client-end performs online play on the navigation type file according to transmission data of the navigation type file, so that when there is a network, a terminal user immediately learns navigation information and clarifies a geographical location.

Optionally, after the instant messaging application obtains the transmission data and the instant messaging application obtains the address of the first server, the instant messaging application sends the transmission data and the address of the first server to the second server by using a network. After receiving the transmission data and the address of the first server, the second server determines, according to the address of the first server, the first server that receives the transmission data, so as to send the transmission data to the first server. After receiving the transmission data, the first server sends the transmission data to the target client-end, and the target client-end performs online play on the to-be-played file corresponding to the transmission data.

Optionally, after receiving the transmission data obtained by the instant messaging application, the first server parses the transmission data and determines a type of the transmission data. For example, the first server determines whether the transmission data is data corresponding to an audio or a video type file, or the transmission data is data corresponding to a navigation type file, so that the target client-end can enable a corresponding execution apparatus to play the to-be-played file. If the result of parsing the transmission data obtained by the instant messaging application is invalid data, for example, the transmission data is garbled, the first server does not transmit the transmission data to the target client-end. After parsing the transmission data, the first server sends the transmission data to the target client-end, and the target client-end performs online play on the to-be-played file corresponding to the transmission data.

Optionally, the target client-end parses data used for playing the to-be-played file from the transmission data, so as to play the to-be-played file.

The instant messaging application in one embodiment of the present invention sends, according to the address of the first server, the transmission data to the first server by using the second server. The first server is configured to send the transmission data to the target client-end, and the target client-end is configured to perform online play on the to-be-played file corresponding to the transmission data. Therefore, a technical effect of simplifying the data transmission process is achieved.

In the solution provided in one embodiment of the present invention, obtaining, by the instant messaging application, the transmission data may be implemented by means of the foregoing S202 to S206. The transmission data is data corresponding to the to-be-played file, and the to-be-played file is a file to be played on the target client-end. The instant messaging application obtains the address of the first server. The first server is a server configured to provide the online play service to the target client-end. The instant messaging application sends, according to the address of the first server, the transmission data to the first server by using the second server. The second server is a server of the instant messaging application, the first server is configured to send the transmission data to the target client-end, and the target client-end is configured to perform online play on the to-be-played file corresponding to the transmission data. Therefore, the data transmission process is simplified, thereby resolving a technical problem in the existing technology that the data transmission process is relatively long.

In an implementation, in S202 of this application, the obtaining, by an instant messaging application, transmission data includes: obtaining, by the instant messaging application, a uniform resource locator (Uniform Resource Locator, URL) of the to-be-played file. The URL is an address of a standard resource on the Internet. Each file on the Internet has its own URL. A location of a file and a manner used by a browser to process the file may be determined by using information included in the URL. When the to-be-played file is a video type file, data corresponding to the video type file is a URL of the video type file. When the to-be-played file is an audio type file, data corresponding to the audio type file is a URL of the audio type file. The data may be stored in a message form. When the to-be-played file is a navigation type file, data corresponding to the navigation type file is a URL of the navigation type file, and the data may be stored in a message form.

The URL may be generated by using a relevant application program installed on an intelligent mobile communications terminal. The application program installed on the intelligent mobile communications terminal may be a media play application program (for example, an audio type application program or a video type application program), or may be a navigation type application program, and the application program installed on the intelligent mobile communications terminal has a data sharing function. When the intelligent mobile communications terminal is connected to a network, the application program installed on the intelligent mobile communications terminal may obtain the URL of the to-be-played file by using the network. The URL of the to-be-played file is sent to the instant messaging application by using the network. For example, the application program installed on the intelligent mobile communications terminal is QQMusic application program, a URL of a song is determined by using QQMusic application program, and the URL of the song is sent to the instant messaging application by using a sharing function of QQMusic application program, so that the instant messaging application obtains the URL of the song.

In S206 of this application, the process of sending, by the instant messaging application according to the address of the first server, the transmission data to the first server by using a second server includes: sending, by the instant messaging application according to the address of the first server, the URL to the first server by using the second server. The first server is configured to send the URL to the target client-end, and the target client-end is configured to play online play on the to-be-played file corresponding to the URL.

The instant messaging application transmits the obtained URL to the target client-end. Specifically, the URL may be transmitted by using a network (for example, a wireless network). The address of the first server needs to be determined, and the URL of the to-be-played file obtained by instant messaging application is transmitted by using the second server. After the instant messaging application obtains the URL of the to-be-played file and the instant messaging application obtains the address of the first server by using the network, the instant messaging application sends, according to the address of the first server, the URL of the to-be-played file to the first server by using the second server Optionally, the instant messaging application sends, according to the address of the first server, the URL of the to-be-played file in a message form to the first server by using the second server. After the first server receives the URL of the to-be-played file, the first server sends the URL of the to-be-played file to the target client-end by using the network. After the target client-end receives the URL of the to-be-played file, the target client-end performs online play on the to-be-played file corresponding to the URL by using the network, thereby achieving immediately playing the to-be-played file and simplifying the data transmission process. For example, when the to-be-played file is an audio type file, the target client-end performs online play on the audio type file according to a URL of the audio type file, so that, when there is a network, a terminal user can immediately listen sound of the audio type file played by the target client-end. When the to-be-played file is a navigation type file, the target client-end performs online play on the navigation type file according to a URL of the navigation type file, so that when there is a network, a terminal user immediately learns navigation information and clarifies a geographical location.

Optionally, after the instant messaging application obtains the URL of the to-be-played file and the instant messaging application obtains the address of the first server, the instant messaging application sends, the URL of the to-be-played file and the address of the first server to the second server by using the network. Optionally, the instant messaging application sends the URL of the to-be-played file and the address of the first server to the second server in a message form by using the network. After receiving the URL of the to-be-played file and the address of the first server, the second server determines, according to the address of the first server, the first server that receives the URL of the to-be-played file, so as to send the URL of the to-be-played file to the first server. After receiving the URL of the to-be-played file, the first server sends the URL of the to-be-played file to the target client-end, and the target client-end performs online play on the to-be-played file corresponding to the URL.

In one embodiment of the present invention, after obtaining the URL of the to-be-played file and obtaining the address of the first server, the instant messaging application sends, according to the address of the first server, the URL to the first server by using the second server, thereby simplifying the data transmission process.

Figure 3:
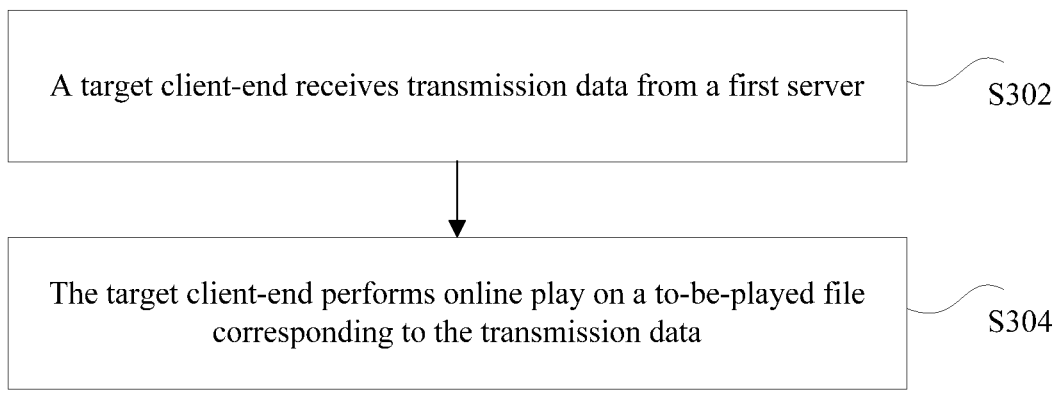
FIG. 3 is a flowchart of a data transmission method according to another embodiment of the present invention.

FIG. 3 is a flowchart of a data transmission method according to another embodiment of the present invention. As shown in FIG. 3, a data transmission method includes the followings.

S302: A target client-end receives transmission data from a first server.

The target client-end is a client-end that can perform online play on a to-be-played file. The first server is a server configured to provide an online play service to the target client-end, and the first server may be a cloud server. The first server may send the transmission data to the target client-end by using a network, and may store a result of transmission data processing performed by the target client-end, so that the target client-end can perform online play on the to-be-played file. An address of the first server is unique and is configured to determine the first server. The address of the first server may be obtained by an instant messaging application.

For example, a music client-end is installed on an in-vehicle terminal. Online play is performed on a to-be-played audio type file by using the music client-end of the in-vehicle terminal. The first server corresponding to the in-vehicle terminal is a cloud server of the Internet of Vehicles. A communications application program may be WeChat application installed on an intelligent mobile communications terminal. An application icon "My car" is selected from an interface of WeChat application. After the application icon "My car" receives a touch control signal, WeChat application obtains an address of the cloud server of the Internet of Vehicles by using a network, so as to determine the cloud server of the Internet of Vehicles through which WeChat application transmits the data.

The transmission data corresponding to the audio type file may alternatively be transmitted to the first server by using a second server, and is transmitted to a sound apparatus of the in-vehicle terminal by using the first server, so that the sound apparatus plays the to-be-played file according to the transmission data corresponding to the to-be-played file. The second server may be a cloud server.

In one embodiment, the transmission data is data corresponding to the to-be-played file. The transmission data may be generated by using a relevant application program installed on the intelligent mobile communications terminal, and the transmission data is obtained by the instant messaging application. After obtaining the transmission data, the instant messaging application sends the transmission data to the first server by using the second server. Optionally, the instant messaging application obtains the transmission data and the address of the first server, and sends, according to the address of the first server, the transmission data to the first server by using the second server. The second server is a server of the instant messaging application. The second server varies depending on different types of instant messaging applications.

The target client-end in one embodiment of the present invention receives the transmission data of the first server. The first server is a server configured to provide the online play service to the target client-end. The transmission data is data corresponding to the to-be-played file to be played on the target client-end, and the transmission data is sent by the instant messaging application to the first server by using the second server. The instant messaging application is configured to: obtain the transmission data and obtain the address of the first server, and send, according to the address of the first server, the transmission data to the first server by using the second server. The second server is a server of the instant messaging application. Therefore, a connection channel is established between the target client-end and the instant messaging application. The target client-end obtains, by using the connection channel, the data corresponding to the to-be-played file, so that wireless transmission of the to-be-played file from the instant messaging application to the target client-end is implemented, thereby simplifying a data transmission process.

S304: The target client-end performs online play on a to-be-played file corresponding to the transmission data.

After receiving the transmission data from the first server, the target client-end performs online play on the to-be-played file corresponding to the transmission data. Optionally, the target client-end plays the to-be-played file according to a type of the to-be-played file. For example, when the to-be-played file is an audio type file, the target client-end immediately plays the to-be-played file by using an audio application program. When the to-be-played file is a navigation type file, the target client-end immediately plays the to-be-played file by using a navigation application program. Therefore, time validity of the play of the to-be-played file is ensured, and seamless transmission of the transmission data corresponding to the to-be-played file is achieved, thereby simplifying the data transmission process.

In the solution provided in the present invention, the target client-end can receive the transmission data from the first server by means of the foregoing S302 to S304. The first server is a server that provides the online play service to the target client-end, the transmission data is data corresponding to the to-be-played file to be played on the target client-end, and the transmission data is sent by the instant messaging application to the first server by using the second server. The instant messaging application obtains the transmission data and the address of the first server, and sends, according to the address of the first server, the transmission data to the first server by using the second server. The second server is a server of the instant messaging application. The target client-end performs online play on the to-be-played file corresponding to the transmission data. Therefore, wireless transmission of the to-be-played file from the instant messaging application to the target client-end is implemented, and seamless transmission of the transmission data corresponding to the to-be-played file is achieved, thereby resolving a technical problem in the existing technology that the data transmission process is relatively long, and simplifying the data transmission process.

In an implementation, the receiving, by a target client-end, transmission data from a first server includes: receiving, by the target client-end, the transmission data of a pre-set type from the first server. The target client-end has a requirement on the type of the transmission data corresponding to the to-be-played file. For example, when the target client-end includes a music client-end, the target client-end receives transmission data corresponding to an audio type file, and plays the audio type file. When the target client-end includes a navigation client-end, the target client-end receives transmission data corresponding to a navigation type file, and plays the navigation type file. The target client-end determines, by using the first server, whether the type of the transmission data satisfies the pre-set type. Optionally, the target client-end determines, by using the first server, whether the type of the transmission data is valid transmission data played on the target client-end. If the first server determines that the type of the transmission data satisfies the pre-set type of the transmission data received by the target client-end, the first server sends the transmission data to the target client-end, and the target client-end plays the to-be-played file according to the transmission data corresponding to the to-be-played file. For example, if the to-be-played file is an audio type file, the music client-end receives transmission data corresponding to the audio file, and directly plays the audio type file according to the transmission data corresponding to the audio type file. If the to-be-played file is a navigation type file, a navigation client-end receives transmission data corresponding to the navigation type file, and directly plays the navigation type file according to the transmission data corresponding to the navigation type file. If the transmission data obtained by the instant messaging application is garbled, or garbled characteristics are generated in a process of transmitting the transmission data to the first server by using the second server, the target client-end does not receive the garbled transmission data.

Figure 4:
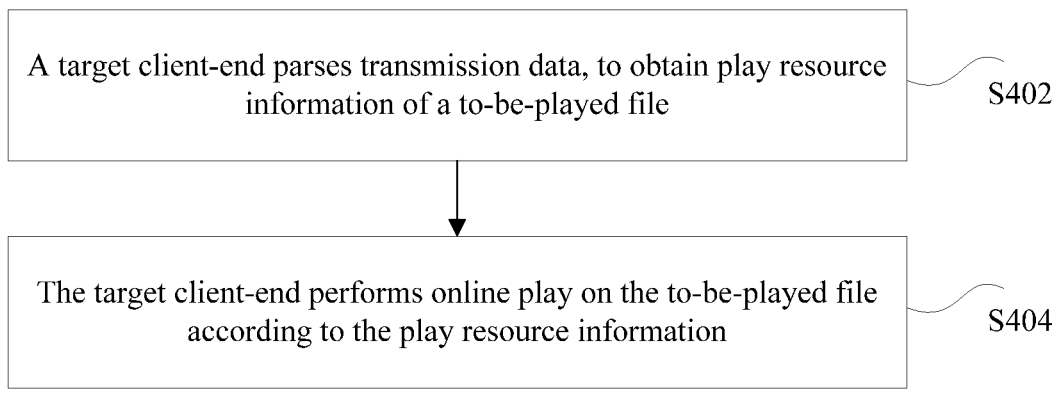
FIG. 4 is a flowchart of a method for performing, by a target client-end, online play on a to-be-played file corresponding to transmission data according to an embodiment of the present invention.

In an implementation, the target client-end performs online play on the to-be-played file corresponding to the transmission data. FIG. 4 is a flowchart of a method for performing, by a target client-end, online play on a to-be-played file corresponding to transmission data according to an embodiment of the present invention. As shown in FIG.

4, a solution of the method for performing, by a target client-end, online play on a to-be-played file corresponding to transmission data includes the following steps:

S402: The target client-end parses the transmission data to obtain play resource information of the to-be-played file.

After the target client-end receives the transmission data from the first server, the target client-end parses the transmission data. The play resource information of the to-be-played file is obtained by parsing the transmission data. The play resource information is information used for playing the to-be-played file.

S404: The target client-end performs online play on the to-be-played file according to the play resource information.

After the target client-end parses the transmission data, the target client-end performs online play on the to-be-played file according to the play resource information.

For example, when the target client-end includes a music client-end, the target client-end parses transmission data corresponding to an audio type file, to obtain play resource information of the audio type file, and the target client-end performs, by using an audio application program, online play on the audio type file according to the play resource information of the audio type file, so that a terminal user listens sound of the audio type file by using the target client-end. When the target client-end includes a navigation client-end, the target client-end parses transmission data corresponding to a navigation type file, to obtain play resource information of the navigation type file, and the target client-end performs, by using a navigation application program, online play on the navigation type file according to the play resource information of the navigation type file, so that a terminal user obtains navigation information of the navigation type file by using the target client-end, thereby improving experience performance of the terminal user.

In one embodiment of the present invention, the target client-end parses the transmission data, to obtain the play resource information of the to-be-played file, and the target client-end performs online play on the to-be-played file according to the play resource information, so that the target client-end can perform online play on the to-be-played file.

In an implementation, the to-be-played file in one embodiment is an audio type file or a navigation type file. The type of the to-be-played file in one embodiment of the present invention is not limited to the foregoing described file type. The foregoing file type is merely a preferred embodiment of the embodiments of the present invention, but does not represent that the type of the to-be-played file in one embodiment of the present invention includes only the foregoing file type. To improve diversification of the transmission data, this embodiment of the present invention may further include other transmission data corresponding to the to-be-played file that can be transmitted, by using the instant messaging, to the first server (for example, a first cloud server) by using the second server (for example, a second cloud server), and transmitted to the target client-end by the first server, and examples are not described one by one herein.

In an implementation, the target client-end is an in-vehicle terminal. The in-vehicle terminal in one embodiment receives transmission data from a cloud server of the Internet of Vehicles, the in-vehicle terminal parses the transmission data, to obtain the play resource information of the to-be-played file, and the in-vehicle terminal performs online play on the to-be-played file according to the play resource information. The cloud server of the Internet of Vehicles is a server configured to provide the online play service to the in-vehicle terminal. The in-vehicle terminal receives the transmission data of the pre-set type from the Internet of Vehicles. The cloud server of the Internet of Vehicles determines whether the type of the transmission data satisfies the pre-set type, and if determining that the type of the transmission data satisfies the pre-set type, the cloud server of the Internet of Vehicles sends the transmission data to the in-vehicle terminal. The transmission data is data corresponding to the to-be-played file to be played on the in-vehicle terminal, and the transmission data is sent to the cloud server of the Internet of Vehicles by the instant messaging application by using a server of the instant messaging application. The instant messaging application is configured to: obtain the transmission data and an address of the cloud server of the Internet of Vehicles, and send, according to the address of the cloud server of the Internet of Vehicles, the transmission data to the cloud server of the Internet of Vehicles by using the server of the instant messaging application, the in-vehicle terminal performs online play on the to-be-played file corresponding to the transmission data.

In the foregoing embodiment, the target client-end receives the transmission data from the first server. The first server is a server configured to provide the online play service to the target client-end. The transmission data is data corresponding to the to-be-played file to be played on the target client-end, and the transmission data is sent to the first server by the instant messaging application by using the second server. The instant messaging application is configured to: obtain the transmission data and obtain the address of the first server, and send, according to the address of the first server, the transmission data to the first server by using the second server. The second server is a server of the instant messaging application. The target client-end performs online play on the to-be-played file corresponding to the transmission data. The target client-end receives the transmission data of the pre-set type from the first server. The first server determines whether the type of the transmission data satisfies the pre-set type, and if determining that the type of the transmission data satisfies the pre-set type, the first server sends the transmission data to the target client-end. The target client-end parses the transmission data, to obtain the play resource information of the to-be-played file, and the target client-end performs online play on the to-be-played file according to the play resource information. The to-be-played file may be an audio type file or a navigation type file, and the target client-end may be an in-vehicle terminal, thereby simplifying the data transmission process.

The data transmission method according to this embodiment of the present invention is described below with reference to specific examples.

Figure 5:
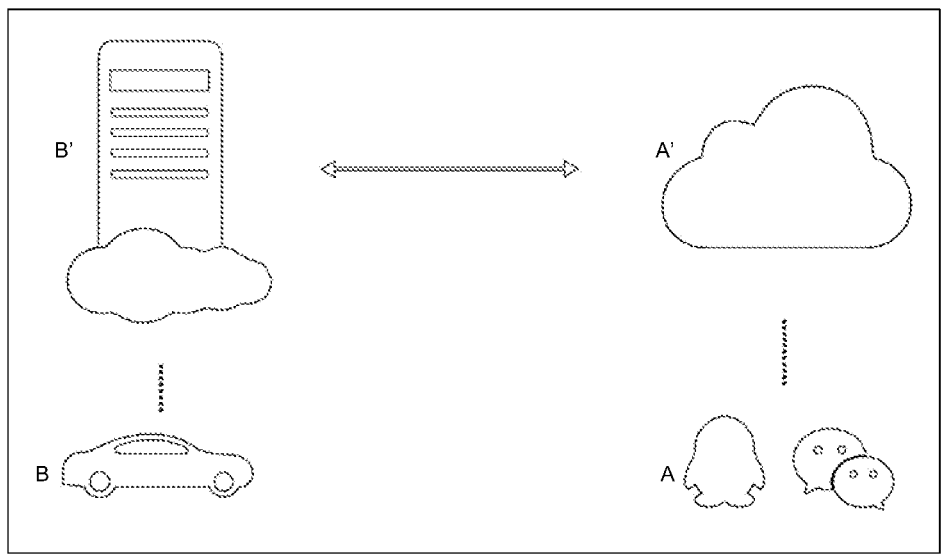
FIG. 5 is a schematic diagram of data transmission of an example of the present invention.

FIG. 5 is a schematic diagram of data transmission of an example of the present invention. As shown in FIG. 5, A is an instant messaging application, A' is a second server corresponding to the instant messaging application, the second server may be a cloud server, B is a target client-end, B' is a first server corresponding to the target client-end, and the first server may be a cloud server. B receives transmission data from B'. B' is a server configured to provide an online play service to B, the transmission data is data corresponding to a to-be-played file to be played on B, and the transmission data is sent to B' by A by using A'. A obtains the transmission data and an address of B', and sends, according to the address of B', the transmission data to B' by using A'. B performs online play on the to-be-played file corresponding to the transmission data. Optionally, B may also feed back to A', by using B', a state of the to-be-played file that is currently playing on B, and A' transmits the state of the to-be-played file to A, thereby improving interaction between A and B.

Figure 6:
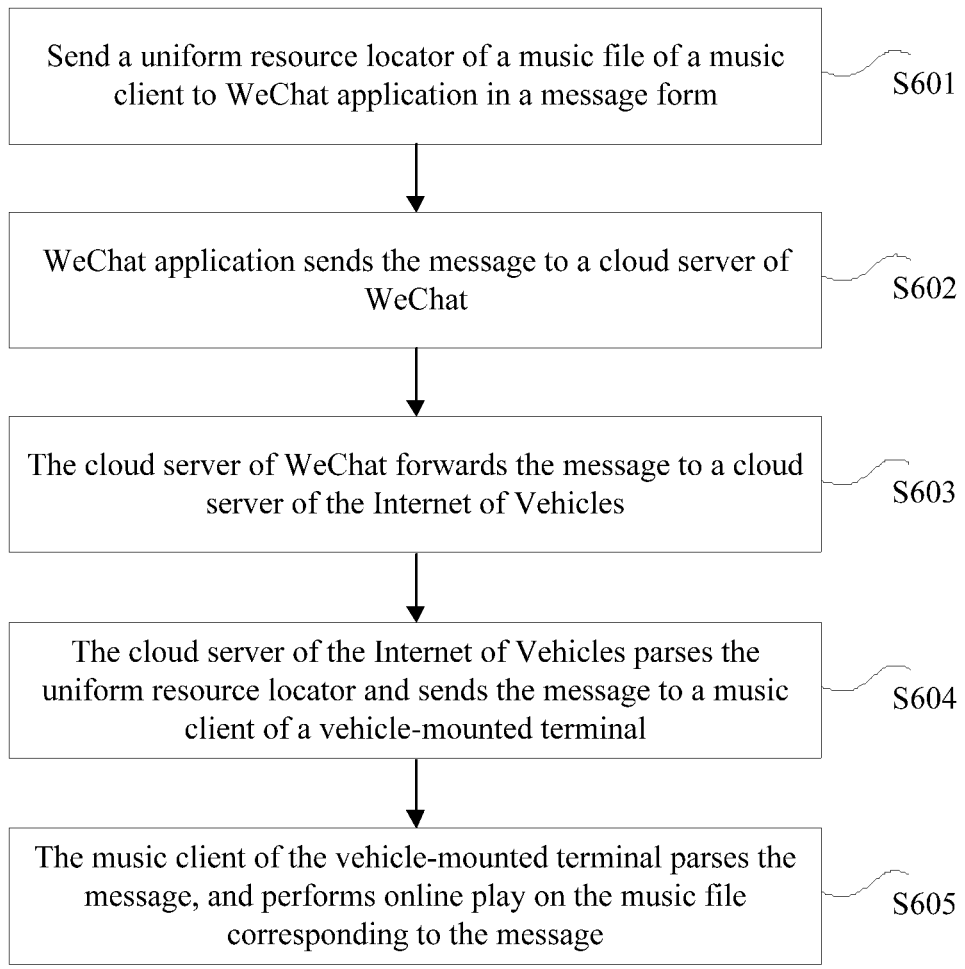
FIG. 6 is a flowchart of a data transmission method according to still another embodiment of the present invention.

FIG. 6 is a flowchart of a data transmission method according to an embodiment of the present invention. As shown in FIG. 6, the data transmission method includes the followings.

S601: Send a URL of a music file of a music client-end to WeChat application in a message form.

The music client-end, for example, is a video type application program installed on an intelligent mobile communications terminal.

In one embodiment, the URL of the music file of the music client-end is sent to WeChat application in a message form, so that an instant messaging application obtains transmission data. The instant messaging application is WeChat application, and the transmission data is the URL of the music file, so that WeChat application obtains the URL of the music file.

S602: WeChat application sends the message to a cloud server of WeChat.

After the URL of the music file of the music client-end is sent to WeChat application in a message form, WeChat application sends the message to the cloud server of WeChat. The cloud server of WeChat is a server of WeChat application.

S603: The cloud server of WeChat forwards the message to a cloud server of the Internet of Vehicles.

In one embodiment, WeChat application sends the message to the cloud server of WeChat, and the cloud server of WeChat forwards the message to the cloud server of the Internet of Vehicles, so that the instant messaging application can obtain the transmission data and an address of a first server, and send, according to the address of the first server, the transmission data to the first server by using the second server. The first cloud server is the cloud server of the Internet of Vehicles, and the second server is the cloud server of WeChat. After WeChat application sends the message to the cloud server of WeChat, WeChat the application further needs to obtain the address of the cloud server of the Internet of Vehicles, and the cloud server of WeChat forwards the message to the cloud server of the Internet of Vehicles by using the address of the cloud server of the Internet of Vehicles.

S604: The cloud server of the Internet of Vehicles parses the URL and sends the message to a music client-end of an in-vehicle terminal.

An example of the music client-end of the in-vehicle terminal is a music client-end of an Internet of Vehicles ROM.

In one embodiment, after the cloud server of WeChat forwards the message to the cloud server of the Internet of Vehicles, the cloud server of the Internet of Vehicles parses the URL and sends the message to the music client-end of the Internet of Vehicles ROM, so that the first server determines whether a type of the transmission data satisfies a pre-set type, and if determining that the type of the transmission data satisfies the pre-set type, the first server sends the transmission data to a target client-end. The target client-end includes the music client-end of the Internet of Vehicles ROM.

S605: The music client-end of the in-vehicle terminal parses the message, and performs online play on the music file corresponding to the message.

In one embodiment, the music client-end of the Internet of Vehicles ROM parses the message, and performs online play on the music file corresponding to the message, so that the target client-end performs online play on a to-be-played file corresponding to the transmission data.

In one embodiment of the present invention, the URL of the music file of the music client-end is sent to WeChat application in a message form, WeChat application sends the message to the cloud server of WeChat, the cloud server of WeChat forwards the message to the cloud server of the Internet of Vehicles, and the cloud server of the Internet of Vehicles parses the URL and sends the message to the music client-end of the Internet of Vehicles ROM, and performs online play on the music file corresponding to the message, thereby simplifying a data transmission process.

Figure 7:
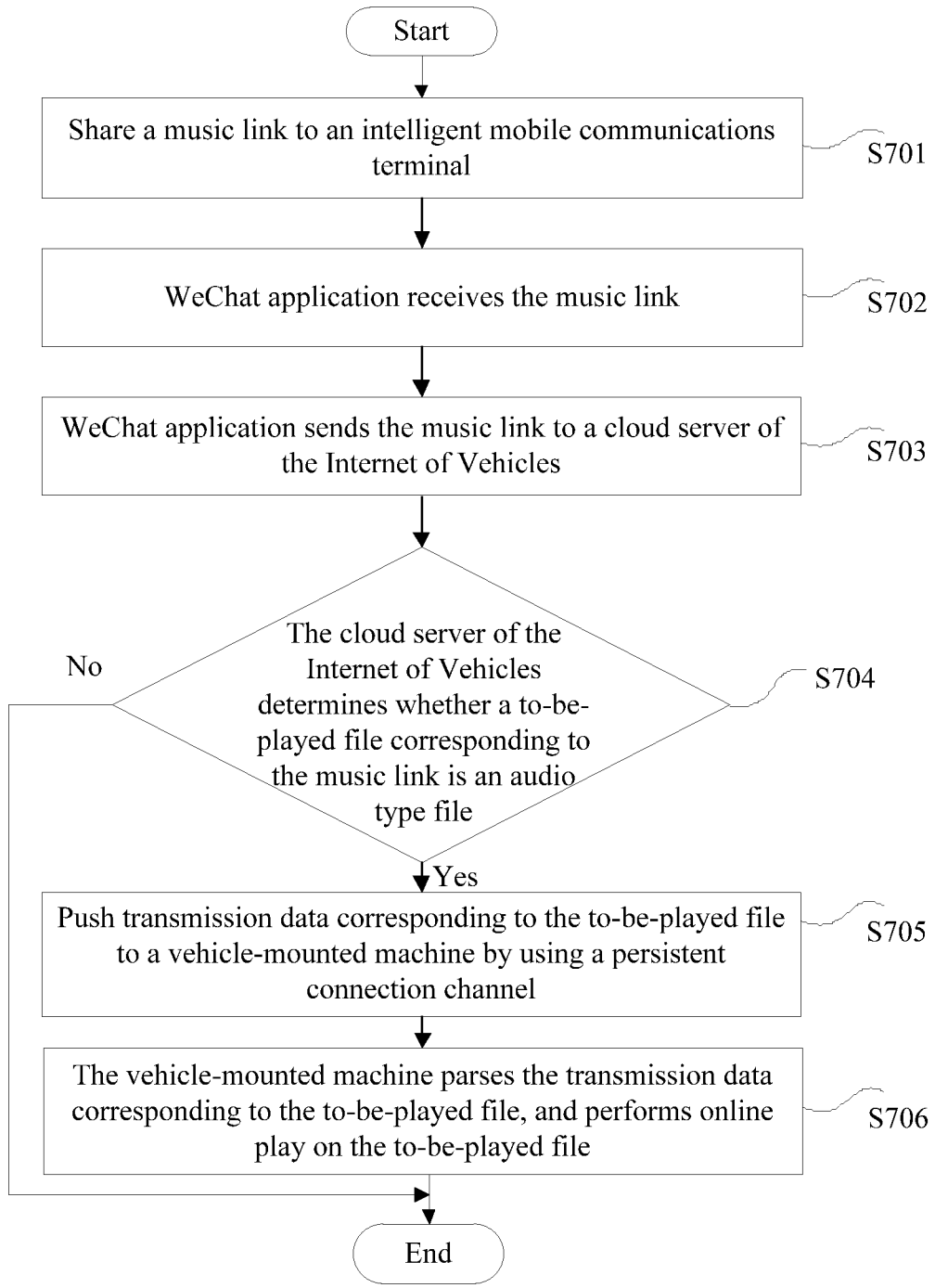
FIG. 7 is a flowchart of a data transmission method according to still another embodiment of the present invention.

FIG. 7 is a flowchart of a data transmission method according to another embodiment of the present invention. As shown in FIG. 7, the data transmission method includes the followings.

S701: Share a music link to WeChat application.

In one embodiment, an instant messaging application is WeChat application, and the music link is transmission data.

S702: WeChat application receives the music link.

WeChat application receives the music link, so that the instant messaging application obtains the transmission data.

S703: WeChat application sends the music link to a cloud server of the Internet of Vehicles.

In one embodiment, WeChat application sends the music link to the cloud server of the Internet of Vehicles, so that the transmission data is sent to a first server by the instant messaging application by using a second server. The first server is a cloud server of the Internet of Vehicles, and the second server is a cloud server of WeChat. WeChat application obtains the music link and obtains an address of the cloud server of the Internet of Vehicles, and sends, according to the address of the cloud server of the Internet of Vehicles, the music link to the cloud server of the Internet of Vehicles by using the cloud server of WeChat.

S704: The cloud server of the Internet of Vehicles determines whether a to-be-played file corresponding to the music link is an audio type file.

In one embodiment, the cloud server of the Internet of Vehicles determines whether the to-be-played file corresponding to the music link is an audio type file, so that the first server determines whether a type of the transmission data satisfies a pre-set type. If determining that the to-be-played file corresponding to the music link is an audio type file, the cloud server of the Internet of Vehicles performs S705.

S705: Push transmission data corresponding to the to-be-played file to an in-vehicle infotainment system by using a persistent connection channel.

In one embodiment, the transmission data corresponding to the to-be-played file is transmitted to the in-vehicle infotainment system by using the persistent connection channel, so that a target client-end receives the transmission data of the pre-set type from the first server.

S706: The in-vehicle infotainment system parses the transmission data corresponding to the to-be-played file, and performs online play on the to-be-played file.

In one embodiment, the in-vehicle infotainment system parses the transmission data corresponding to the to-be-played file, and performs online play on the to-be-played file, so that the target client-end parses the transmission data, to obtain play resource information of the to-be-played file, and the target client-end performs online play on the to-be-played file according to the play resource information.

In one embodiment of the present invention, the music link is shared to an intelligent mobile communications terminal; WeChat application receives the music link;

WeChat application sends the music link to the cloud server of the Internet of Vehicles; the cloud server of the Internet of Vehicles determines whether the to-be-played file corresponding to the music link is an audio type file, and pushes the transmission data corresponding to the to-be-played file to the in-vehicle infotainment system by using the persistent connection channel; and the in-vehicle infotainment system parses the transmission data corresponding to the to-be-played file, and performs online play on the to-be-played file, thereby simplifying a data transmission process.

Figure 8:
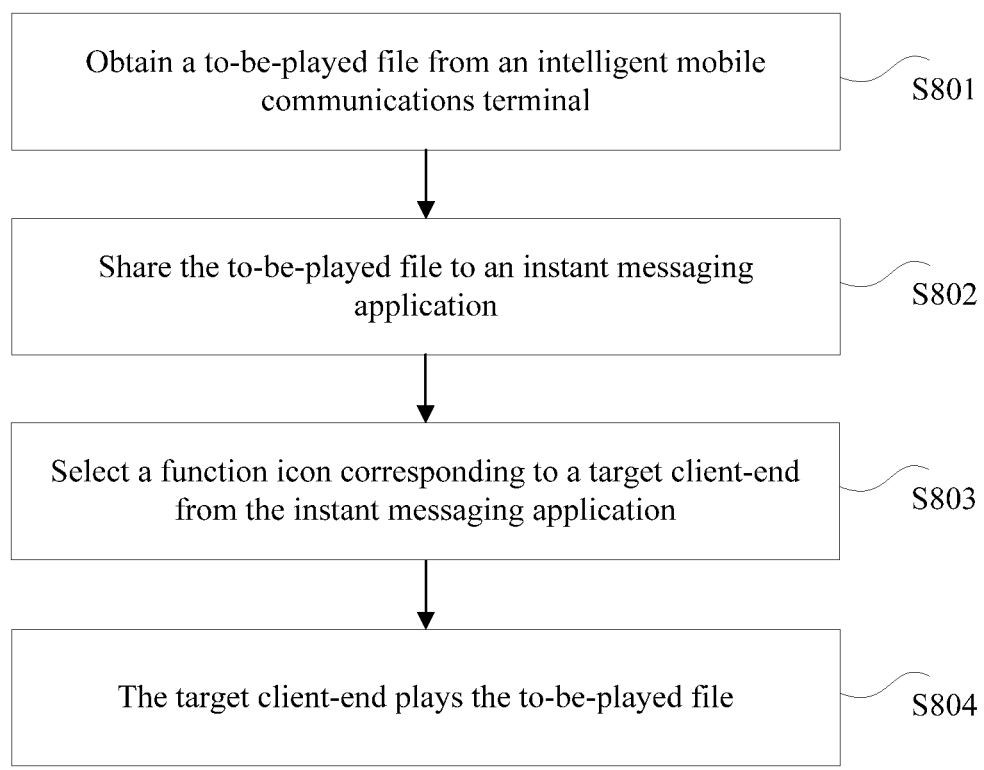
FIG. 8 is a flowchart of a method of performing, by a user, an operation by using a terminal according to an embodiment of the present invention.

FIG. 8 is a flowchart of a method of performing, by a user, an operation by using a terminal according to an embodiment of the present invention. As shown in FIG. 8, the method includes the followings.

S801: Obtain a to-be-played file from an intelligent mobile communications terminal.

A user searches for the to-be-played file by using the intelligent mobile communications terminal. Optionally, the intelligent mobile communications terminal may be an intelligent mobile communications terminal, such as a smartphone mobile phone or a tablet computer, in which an Android system or an iOS system is installed. The to-be-played file may be downloaded by using an application program installed on the intelligent mobile communications terminal. For example, an audio type file is downloaded by using KuGou music application program, or DuoMi music application program, or QQMusic application program. The user downloads a single song or a song list from the intelligent mobile communications terminal, so that the intelligent mobile terminal obtains the to-be-played file.

S802: Share the to-be-played file to an instant messaging application.

After the to-be-played file is obtained from the intelligent mobile communications terminal, the to-be-played file is shared to the instant messaging application. The application program of this embodiment has a data sharing function, so that the obtained to-be-played file may be shared to another client-end. Optionally, the to-be-played file is an audio type file, and the application program may be KuGou music application program, or DuoMi music application program, or QQMusic application program, or the like. The application program has a song sharing function, so that the obtained audio type file is shared to the instant messaging application such as WeChat application or QQ application.

S803: Select a function icon corresponding to a target client-end from the instant messaging application.

After the to-be-played file is shared to the instant messaging application, the function icon corresponding to the target client-end is selected from the instant messaging application. For example, after the to-be-played file is shared to WeChat application, a function icon of "My car" is selected from a friend list of WeChat application. That is, the vehicle "My car" was added in advance as a friend in the WeChat application, and was on the friend list of the user of the WeChat application. In other words, the "My car" is a special friend of the user, and the information associated with the "My car" (e.g., address information, capability information, identification information) is also contained with the special friend entity of the WeChat application. The sharing mechanism between the user and the friends of the user may also apply between the user and the special friend "My car".

S804: The target client-end plays the to-be-played file.

After the user terminal selects the function icon corresponding to the target client-end from the instant messaging application, the target client-end plays the to-be-played file. For example, after the function icon corresponding to "My car" is selected from WeChat application, the to-be-played file is shared to the target client-end "My car". The target client-end "My car" is installed on the in-vehicle infotainment system. After the to-be-played file is successfully shared to the target client-end "My car", the in-vehicle infotainment system may perform online play on the to-be-played file. That is, these steps may be performed with the sharing function of the WeChat application.

Figure 9:
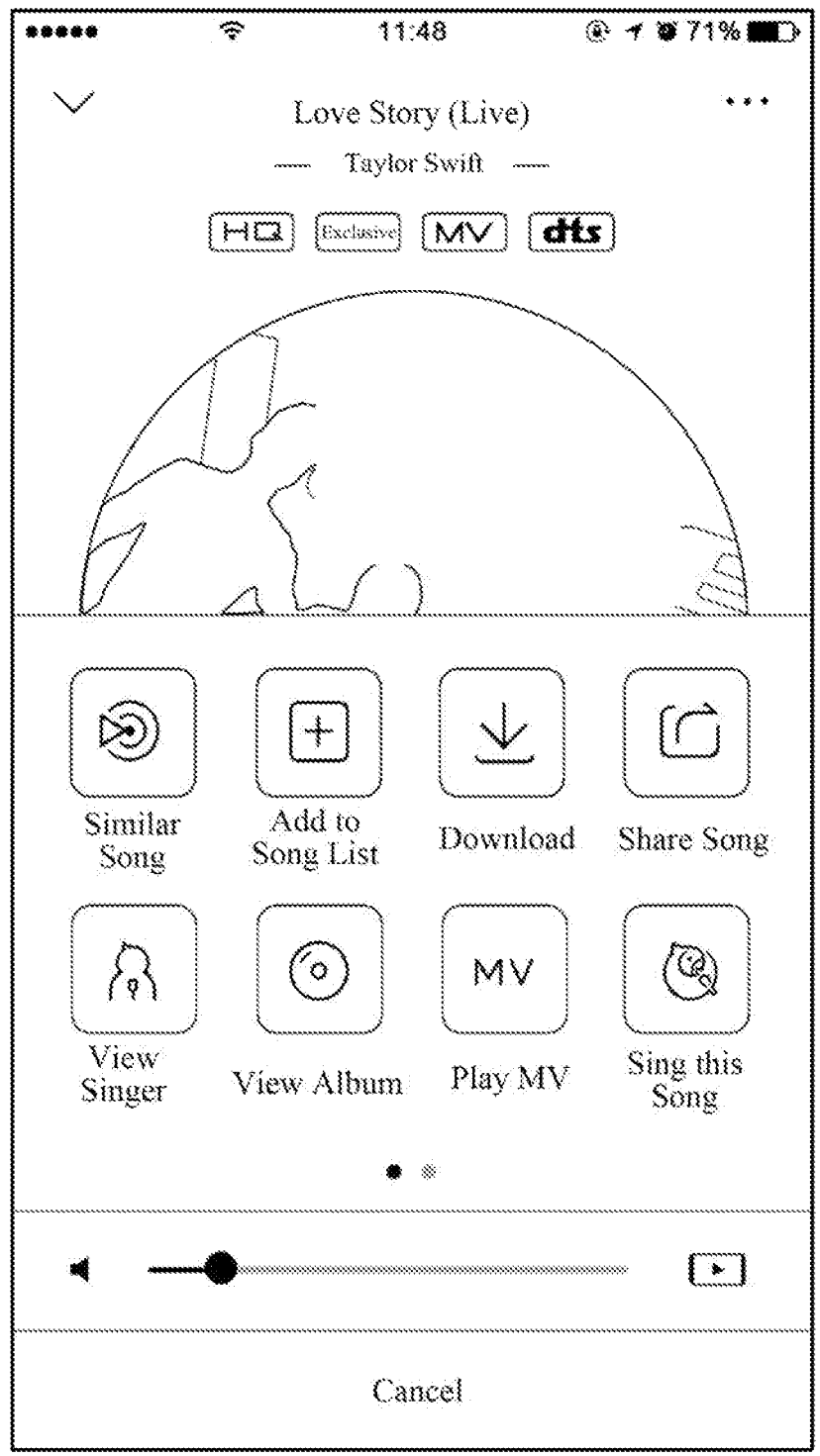
FIG. 9 is a schematic diagram of obtaining, by an application program, a to-be-played file according to an embodiment of the present invention.

FIG. 9 is a schematic diagram of obtaining, by an application program, a to-be-played file according to an embodiment of the present invention. As shown in FIG. 9, the application program is QQ music application installed on an intelligent mobile communications terminal (for example, a smartphone). The QQ music application plays a song, and displays a song name "Love Story (Live)" and a singer name "Taylor Swift". QQ music further includes functions: "Similar Song", "Add to Song List", "Download", "Share Song", "View Singer", "View Album", "Play MV", "Sing this Song", and "Cancel". The "Similar Song" function is used for searching and playing a song similar to the played song, so as to provide more music resources to a user terminal. The "Add to Song List" function is used for adding the song to a song list. The "Download" function is used for downloading the played song, so as to obtain transmission data corresponding to the played song. The "Share Song" function is used for sharing the song to another client-end. The "View Singer" function is used for viewing singer information of the played song. The "View Album" function is used for viewing an album to which the played song belongs. The "Play MV" function is used for playing an MV corresponding to the song. The "Sing this Song" function is used for singing the song by the user terminal. The "Cancel" function is used for cancelling the obtained to-be-played file. By means of the foregoing functions of QQMusic, the user terminal selects a to-be-played file, so that the to-be-played file is obtained from QQMusic.

Figure 10:
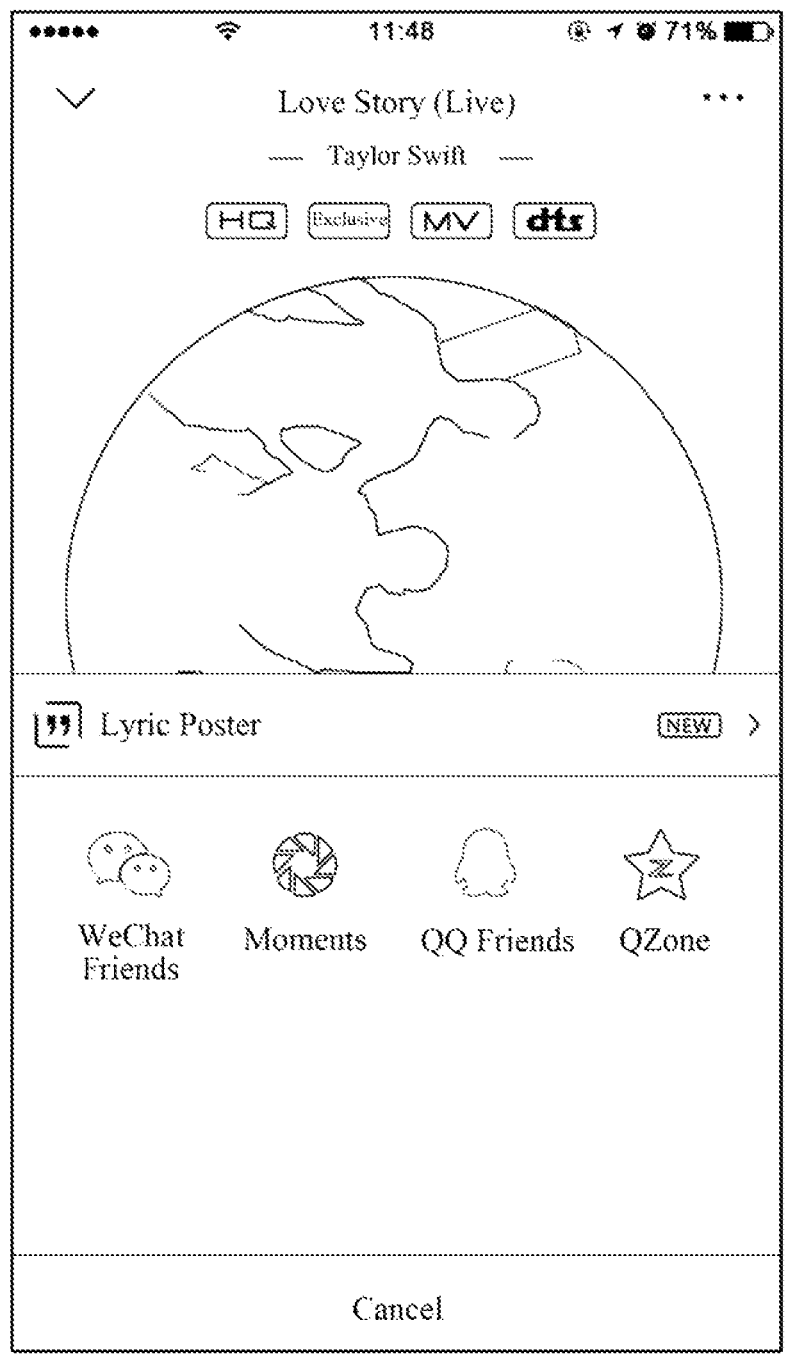
FIG. 10 is a schematic diagram of sharing, by an application program, a to-be-played file according to an embodiment of the present invention.

FIG. 10 is a schematic diagram of sharing, by an application program, a to-be-played file according to an embodiment of the present invention. As shown in FIG. 10, the application program is QQMusic application program, and a song sharing interface includes: "WeChat Friends", "Moments", "QQ Friends", "QZone", "Cancel", and the like. The to-be-played file may be shared to a WeChat friend by clicking "WeChat Friends". The to-be-played file may be shared to a QQ friend by clicking "QQ Friends". The to-be-played file may be shared to Qzone by clicking "QZone". To-be-played file sharing may be cancelled by clicking "Cancel". After the to-be-played file is obtained from an intelligent mobile communications terminal, the foregoing function is selected to share the to-be-played file is shared to an instant messaging application.

Figure 11:
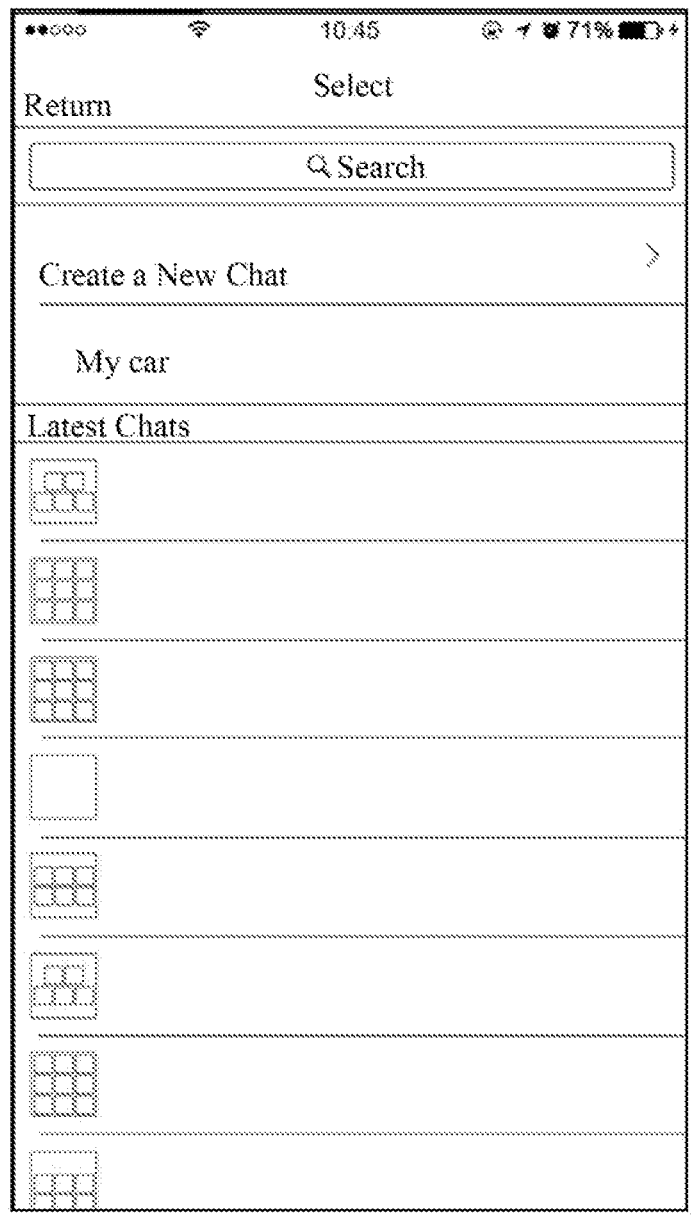
FIG. 11 is a schematic diagram of an instant messaging application according to an embodiment of the present invention.

FIG. 11 is a schematic diagram of an instant messaging application according to an embodiment of the present invention. As shown in FIG. 11, the instant messaging application is WeChat application. A new chat may be created in WeChat application, or a message sending object may be searched in the search box. WeChat application includes a friend list. The friend list includes a special friend: a target client-end "My car". "My car" corresponds to an in-vehicle terminal. When "My car" is not directly displayed on WeChat application, "My car" is found by searching "My car" in the search box. The to-be-played file may be immediately shared to the target client-end "My car" by clicking "My car", so that an objective of one-click sending of the to-be-played file to the car is implemented.

Figure 12:
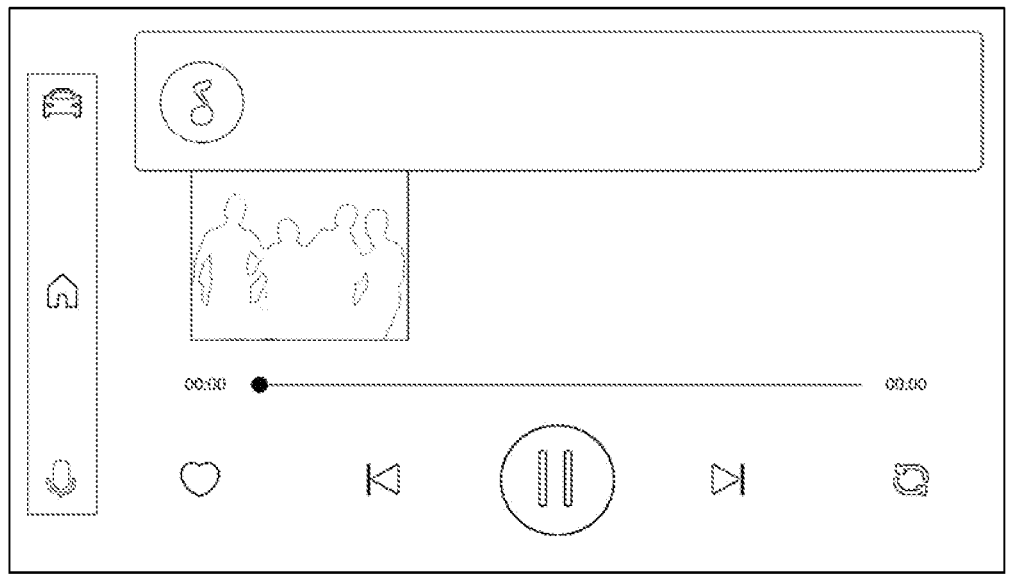
FIG. 12 is a schematic diagram of performing, by a target client-end, online play on a to-be-played file according to an embodiment of the present invention.

FIG. 12 is a schematic diagram of performing, by a target client-end, online play on a to-be-played file according to an embodiment of the present invention. As shown in FIG. 12, after the to-be-played file is successfully shared to the target client-end "My car", an in-vehicle infotainment system immediately performs online play on an audio type file "Love Story (Live)" shared by WeChat application, thereby immediately playing the to-be-played file is achieved and simplifying a data transmission process.

For example, a user terminal finds a song that the user terminal wants to listen from a music application program of a mobile phone terminal. When the song needs to be played in a vehicle, the song is shared to WeChat application by using a sharing function in the music application program without establishing any complex formal connection, and the song is sent, by using WeChat application, to the vehicle for playing. This is simple and quick, and satisfies a use habit of the terminal user that the terminal user shares a variety of content to WeChat application by using the mobile phone terminal.

In one embodiment of the present invention, the to-be-played file is obtained from the intelligent mobile communications terminal, the to-be-played file is shared to the instant messaging application, and the function icon corresponding to the target client-end is selected from the instant messaging application, so that the target client-end plays the to-be-played file; and therefore, a formal connection channel does not need to be established between the instant messaging application and the target client-end, thereby implementing that the user one-click sends transmission data corresponding to the to-be-played file to the target client-end. In addition, the target client-end immediately plays the to-be-played file, so that the user can make the target client-end to play the to-be-played file on the mobile terminal by using the instant messaging application at any time, thereby simplifying a data transmission process, and improving experience performance of the user terminal.

In the foregoing preferred embodiments, the target client-end receives the transmission data from the first server. The first server is a server configured to provide the online play service to the target client-end. The transmission data is data corresponding to the to-be-played file to be played on the target client-end, and the transmission data is sent to the first server by the instant messaging application by using the second server. The instant messaging application is configured to: obtain the transmission data and obtain the address of the first server, and send, according to the address of the first server, the transmission data to the first server by using the second server. The second server is a server of the instant messaging application. The target client-end performs online play on the to-be-played file corresponding to the transmission data. Therefore, the data transmission process is simplified.

It should be noted that, for brief description, the foregoing method embodiments are described as a series of action combinations. However, a person skilled in the art should understand that the present disclosure is not limited to the described order of the actions, because according to the present disclosure, some steps may be performed in other orders or simultaneously. Besides, a person skilled in the art should also understand that the embodiments described in this specification all belong to preferred embodiments, and related actions and modules are not necessary for the present disclosure.

According to the foregoing descriptions of the implementation manners, a person skilled in the art may clearly learn that the method in the foregoing embodiment may be implemented by using software and a necessary universal hardware platform or by using hardware. In many cases, the former one is a preferred implementation manner. Based on such an understanding, the technical solution of the present disclosure essentially, or the part contributing to the existing technology, may be presented in a form of a software product. The computer software product is stored in a storage medium (such as a ROM/RAM, a magnetic disk, or an optical disc) including several instructions to enable a terminal device (which may be a mobile phone, a computer, a server, a network device, or the like) to perform the methods described in the embodiments.

Figure 13:
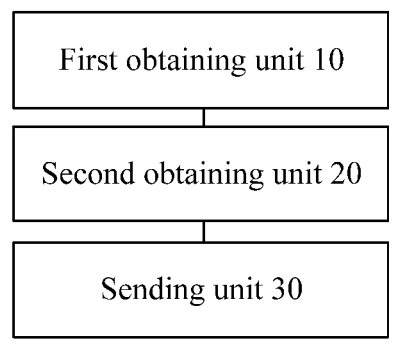
FIG. 13 is a schematic diagram of a data transmission apparatus according to an embodiment of the present invention.

According to an embodiment of the present invention, an apparatus for implementing the foregoing data transmission method is further provided. FIG. 13 is a schematic diagram of a data transmission apparatus according to an embodiment of the present invention. As shown in FIG. 13, the data transmission apparatus includes: a first obtaining unit 10, a second obtaining unit 20, and a sending unit 30.

The first obtaining unit 10 is configured to obtain transmission data. The transmission data is data corresponding to a to-be-played file, and the to-be-played file is a file to be played on a target client-end.

The second obtaining unit 20 is configured to obtain an address of a first server. The first server is a server configured to provide an online play service to the target client-end. The first server may be a first cloud server.

The sending unit 30 is configured to send, according to the address of the first server, the transmission data to the first server by using a second server. The second server is a server of an instant messaging application, the first server is configured to send the transmission data to the target client-end, and the target client-end is configured to perform online play on the to-be-played file corresponding to the transmission data. The second server may be a second cloud server.

In the data transmission apparatus in one embodiment, the first obtaining unit 10 may be configured to perform S202 in the embodiment of the present invention, the second obtaining unit 20 may be configured to perform S204 in the embodiment of the present invention, and the sending unit 30 may be configured to perform S206 in the embodiment of the present invention.

The first obtaining unit 10 obtains the transmission data, that is, the first obtaining unit 10 obtains the data corresponding to the to-be-played file. The transmission data may be generated by using an application program installed on an intelligent mobile communications terminal, and the application program installed on the intelligent mobile communications terminal has a data sharing function. When the intelligent mobile communications terminal is connected to a network, the application program installed on the intelligent mobile communications terminal may download, by using the network, the to-be-played file corresponding to the transmission data. The transmission data corresponding to the to-be-played file is sent to the instant messaging application by using the network. For example, the application program installed on the intelligent mobile communications terminal is QQMusic application program, transmission data of a song is determined by using QQMusic application program, and the transmission data of the song is sent to the instant messaging application by using a sharing function of QQMusic application program, so that the instant messaging application obtains the transmission data of the song by using the first obtaining unit 10.

The address of the first server is obtained by using the second obtaining unit 20. Optionally, the second obtaining unit 20 receives a touch control signal of the address of the first server, and obtains the address of the first server according to the touch control signal, so that a transmission target of the transmission data is determined. For example, the instant messaging application is WeChat application. An application icon "My car" is selected from an interface of WeChat application. After the application icon "My car" receives the touch control signal, WeChat application obtains an address of a cloud server of the Internet of Vehicles by using the second obtaining unit 20, so that it is determined that WeChat application needs to transmit data through the cloud server of the Internet of Vehicles.

After the first obtaining unit 10 obtains the transmission data and the second obtaining unit 20 obtains the address of the first server, the sending unit 30 sends, according to the address of the first server, the transmission data to the first server by using the second server. After the first server receives the transmission data, the first server sends the transmission data to the target client-end by using the network, thereby implementing wireless transmission of the transmission data of the to-be-played file. After the target client-end receives the transmission data, the target client-end performs online play on the to-be-played file corresponding to the transmission data by using the network, thereby immediately playing the to-be-played file and simplifying a data transmission process.

In one embodiment of the present invention, the first obtaining unit 10 obtains the transmission data. The transmission data is data corresponding to the to-be-played file, and the to-be-played file is a file to be played on the target client-end. The second obtaining unit 20 obtains the address of the first server. The first server is a server configured to provide the online play service to the target client-end. The sending unit 30 sends, according to the address of the first server, the transmission data to the first server by using the second server. The second server is a server of the instant messaging application, the first server is configured to send the transmission data to the target client-end, and the target client-end is configured to perform online play on the to-be-played file corresponding to the transmission data. Therefore, a technical problem in the existing technology that the data transmission process is relatively long is resolved, and the data transmission process is simplified.

Figure 14:
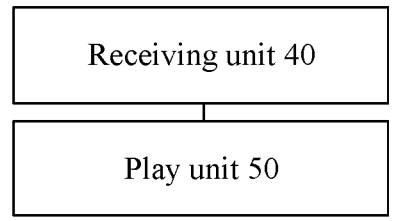
FIG. 14 is a schematic diagram of a data transmission apparatus according to another embodiment of the present invention.

According to an embodiment of the present invention, another apparatus for implementing the foregoing data transmission method is further provided. FIG. 14 is a schematic diagram of a data transmission apparatus according to another embodiment of the present invention. As shown in FIG. 14, the data transmission apparatus includes: a receiving unit 40 and a play unit 50.

The receiving unit 40 is configured to receive transmission data from a first server. The play unit 50 is configured to perform online play on a to-be-played file corresponding to the transmission data.

In the data transmission apparatus in one embodiment, the receiving unit 40 may be configured to perform S302 in the embodiment of the present invention, and the play unit 50 may be configured to perform S304 in the embodiment of the present invention.

In the foregoing embodiment, the receiving unit 40 receives the transmission data from the first server. The first server is a server configured to provide the online play service to the target client-end. The transmission data is data corresponding to the to-be-played file to be played on the target client-end, and the transmission data is sent to the first server by an instant messaging application by using the second server. The instant messaging application is configured to: obtain the transmission data and obtain the address of the first server, and send, according to the address of the first server, the transmission data to the first server by using the second server. The second server is a server of the instant messaging application.

For example, a music client-end is installed on an in-vehicle terminal. The music client-end on the in-vehicle terminal receives, by using the receiving unit 40, transmission data corresponding to a to-be-played audio type file from the first server, so as to perform online play on the to-be-played audio type file, thereby implementing wireless transmission of the to-be-played file.

After the receiving unit 40 receives the transmission data from the first server, the play unit 50 performs online play on the to-be-played file corresponding to the transmission data. Optionally, the play unit 50 plays the to-be-played file according to a type of the to-be-played file. For example, when the to-be-played file is an audio type file, the play unit 50 immediately plays the to-be-played file by using a music application program. When the to-be-played file is a navigation type file, the play unit 50 immediately plays the to-be-played file by using a navigation application program. Therefore, time validity of the play of the to-be-played file is ensured, and the seamless transmission of the transmission data corresponding to the to-be-played file is achieved, thereby simplifying a data transmission process.

In an implementation, the receiving unit 40 receives the transmission data of a pre-set type from the first server. The first server determines whether the type of the transmission data satisfies the pre-set type, and if determining that the type of the transmission data satisfies the pre-set type, the first server sends the transmission data to the target client-end.

The target client-end receives the transmission data of the pre-set type from the first server by using the receiving unit 40. The target client-end has a requirement on a type of the transmission data corresponding to the to-be-played file. For example, when the target client-end includes a music client-end, the target client-end receives, by using the receiving unit 40, transmission data corresponding to an audio type file, and plays the audio type file by using the play unit 50. When the target client-end includes a navigation client-end, the target client-end receives, by using the receiving unit 40, transmission data corresponding to a navigation type file, and plays the navigation type file by using the play unit 50. The first server determines whether the type of the transmission data satisfies the pre-set type. Optionally, the first server determines whether the type of the transmission data is valid transmission data played on the target client-end. If the first server determines that the type of the transmission data satisfies the pre-set type of the transmission data received by the target client-end, the first server sends the transmission data to the target client-end. The target client-end receives the transmission data by using the receiving unit 40, and plays, by using the play unit 50, the to-be-played file according to the transmission data corresponding to the to-be-played file. If the transmission data is garbled, or garbled characteristics are generated in a process of transmitting the transmission data to the first server by using the second server, the receiving unit 40 does not receive the garbled transmission data.

Figure 15:
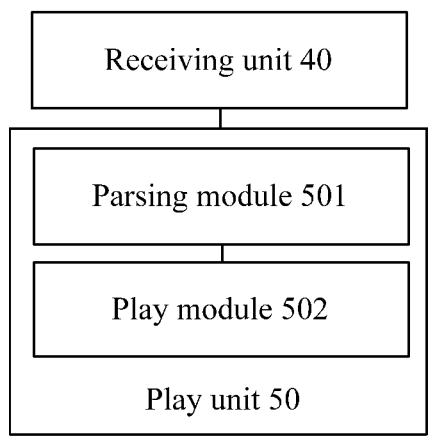
FIG. 15 is a schematic diagram of a data transmission apparatus according to still another embodiment of the present invention.

FIG. 15 is a schematic diagram of a data transmission apparatus according to still another embodiment of the present invention. As shown in FIG. 15, the data transmission apparatus includes a receiving unit 40 and a play unit 50. The play unit 50 includes a parsing module 501 and a play module 502.

Functions of the receiving unit 40 and the play unit 50 in one embodiment are the same as those in the data transmission apparatus shown in FIG. 14, and details are not described herein again.

The parsing module 501 is configured to parse the transmission data, to obtain play resource information of the to-be-played file. The play module 502 is configured to perform online play on the to-be-played file according to the play resource information.

After the target client-end receives the transmission data from the first server by using the receiving unit 40, the target client-end parses the transmission data by using the parsing module 501. The parsing module 501 parses the transmission data, to obtain the play resource information of the to-be-played file. The play resource information is information used for playing the to-be-played file.

After the target client-end parses the transmission data by using the parsing module 501, the target client-end performs, by using the play module 502, online play on the to-be-played file according to the play resource information.

For example, when the target client-end includes a music client-end, the target client-end parses, by using the parsing module 501, transmission data corresponding to an audio type file, to obtain play resource information of the audio type file, and the play module 502 performs, by using an audio application program, online play on the audio type file according to the play resource information of the audio type file, so that a user terminal listens sound of the audio type file from an instant messaging application by using the target client-end. When the target client-end includes a navigation client-end, the target client-end parses, by using the parsing module 501, transmission data corresponding to a navigation type file, to obtain play resource information of the navigation type file, and the play module 502 performs, by using a navigation application program, online play on the navigation type file according to the play resource information of the navigation type file, so that a terminal user obtains navigation information of the navigation type file from an instant messaging application by using the target client-end. Therefore, experience performance of the terminal user is improved.

In one embodiment of the present invention, the receiving unit 40 receives the transmission data from the first server. The first server is a server configured to provide the online play service to the target client-end. The transmission data is data corresponding to the to-be-played file to be played on the target client-end, and the transmission data is sent to the first server by the instant messaging application by using the second server. The instant messaging application is configured to: obtain the transmission data and obtain the address of the first server, and send, according to the address of the first server, the transmission data to the first server by using the second server. The second server is a server of the instant messaging application. Then, the play unit 50 performs online play on the to-be-played file corresponding to the transmission data. Therefore, a technical problem in the existing technology that a data transmission process is relatively long is resolved and the data transmission process is simplified.

An embodiment of the present invention further provides an in-vehicle terminal. The in-vehicle terminal includes the data transmission apparatus according to any one of the foregoing embodiments of the present invention.

Optionally, the in-vehicle terminal is an Internet of Vehicles ROM. The Internet of Vehicles ROM is used on an in-vehicle infotainment system connected to a network in a vehicle. The Internet of Vehicles ROM may provide navigation information, entertainment information, security service information, and the like. When the Internet of Vehicles ROM is connected to the network, the Internet of Vehicles ROM obtains transmission data. The in-vehicle terminal in one embodiment may search location information of the vehicle, perform a regional vehicle search, perform real-time monitoring and tracing on a driving condition of the vehicle, search a wheel path of the vehicle, and play back the track of the vehicle. The in-vehicle terminal may further have functions such as generating an alarm when the vehicle is abnormal, photographing, and video surveillance. The in-vehicle terminal may perform management, deregistration, browsing, and the like on a to-be-played file transmitted by a cloud server of the Internet of Vehicles. Interaction between the in-vehicle terminal and the instant messaging application is strong.

An embodiment of the present invention further provides a storage medium. The storage medium may store program code used for performing the data transmission method according any one of the foregoing embodiments.

Optionally, in one embodiment, the storage medium may be located in at least one of multiple network devices in a computer network.

Optionally, in one embodiment, the storage medium is configured for storing program code for performing the following steps:

Step 1: An instant messaging application obtains transmission data, where the transmission data is data corresponding to a to-be-played file, and the to-be-played file is a file to be played on a target client-end.

Step 2: The instant messaging application obtains an address of a first server, where the first server is a server configured to provide an online play service to the target client-end.

Step 3: The instant messaging application sends, according to the address of the first server, the transmission data to the first server by using a second server, where the second server is a server of the instant messaging application, the first server is configured to send the transmission data to the target client-end, and the target client-end is configured to perform online play on the to-be-played file corresponding to the transmission data.

Optionally, the storage medium is further configured for storing program code for performing the following steps: The instant messaging application obtains a URL of the to-be-played file, and the instant messaging application sends, according to the address of the first server, the URL to the first server by using the second server, where the first server is configured to send the URL to the target client-end, and the target client-end is configured to perform online play on the to-be-played file corresponding to the URL.

Optionally, in one embodiment, the storage medium is further configured for storing program code for performing the following steps:

Step 1: The target client-end receives the transmission data from the first server, where the first server is a server configured to provide the online play service to the target client-end; the transmission data is data corresponding to the to-be-played file to be played on the target client-end, and the transmission data is sent to the first server by the instant messaging application by using the second server; the instant messaging application is configured to: obtain the transmission data and obtain the address of the first server, and send, according to the address of the first server, the transmission data to the first server by using the second server; and the second server is a server of the instant messaging application.

Step 2: The target client-end performs online play on the to-be-played file corresponding to the transmission data.

Optionally, the storage medium is further configured for storing program code for performing the following steps: The target client-end parses the transmission data, to obtain play resource information of the to-be-played file; and the target client-end performs online play on the to-be-played file according to the play resource information.

Optionally, the storage medium is further configured for storing program code for performing the following steps: The target client-end receives the transmission data of a pre-set type from the first server, where the first server determines whether the type of the transmission data satisfies the pre-set type, and if determining that the type of the transmission data satisfies the pre-set type, the first server sends the transmission data to the target client-end.

Optionally, in one embodiment, the storage medium may include, but is not limited to, a medium that may store program code such as a USB flash drive, a read-only memory (ROM), a random-access memory (RAM), a removable hard disk, a magnetic disk, an optical disc, or the like.

An embodiment of the present invention further provides a computer terminal (that is, a computing apparatus). The computer terminal may be any computer terminal device in a computer terminal group. Optionally, in one embodiment, the computer terminal may be replaced with a terminal device such as a mobile terminal.

Optionally, in one embodiment, the computer terminal may be located in at least one of multiple network devices in a computer network.

Figure 16:
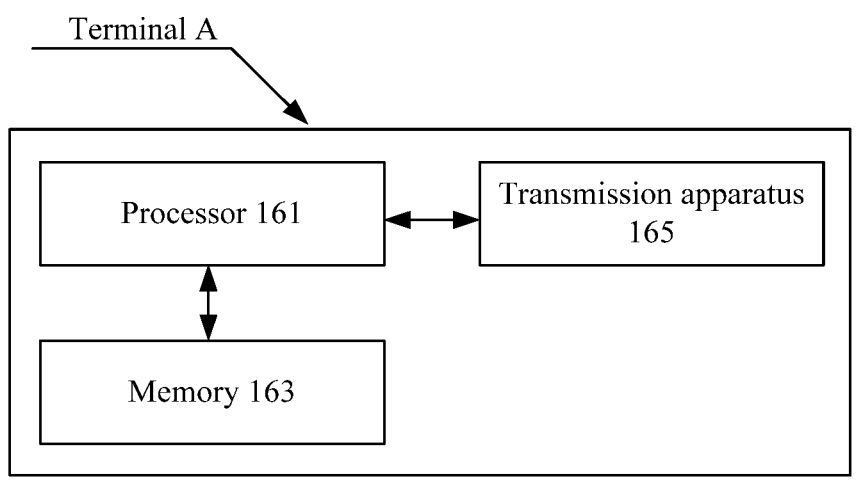
FIG. 16 is a structural block diagram of a computer terminal according to an embodiment of the present invention.

FIG. 16 is a structural block diagram of a computer terminal according to an embodiment of the present invention. As shown in FIG. 16, the computer terminal A may include: one or more (only one is shown in the figure) processors 161, a memory 163, and a transmission apparatus 165.

The memory 163 may be configured to store a software program and module, for example, program instructions/modules of the data transmission method and apparatus in any one of the foregoing embodiments of the present invention. The processor 161 runs the software program and module stored in the memory 163, to implement various functional applications and data processing, that is, implement the data transmission method. The memory 163 may include a high-speed random-access memory, and may further include a non-volatile memory, for example, one or more magnetic storage devices, flash memories or other non-volatile solid-state memories. In some examples, the memory 163 may further include memories remotely disposed relative to the processor 161, and these remote memories may be connected to the computer terminal A by using a network. Examples of the network include, but are not limited to, the Internet, an intranet, a local area network, a mobile communications network, or a combination thereof.

The transmission apparatus 165 is configured to receive or send data by using a network. A specific example of the network may include a wired network or a wireless network. In an example, the transmission apparatus 165 includes a network adapter (NIC). The network adapter may be connected to another network device and a router by using a network cable, so as to communicate with the Internet or a local network. In an example, the transmission apparatus 165 is a RF module, and is configured to communicate with the Internet in a wireless manner.

Specifically, the memory 163 is configured to store a pre-set action condition, information about a pre-set authorized user, and an application program.

The processor 161 may invoke the information and the application program that are stored in the memory 163, to perform the following steps:

Step 1: An instant messaging application obtains transmission data, where the transmission data is data corresponding to a to-be-played file, and the to-be-played file is a file to be played on a target client-end.

Step 2: The instant messaging application obtains an address of a first server, where the first server is a server configured to provide an online play service to the target client-end.

Step 3: The instant messaging application sends, according to the address of the first server, the transmission data to the first server by using a second server, where the second server is a server of the instant messaging application, the first server is configured to send the transmission data to the target client-end, and the target client-end is configured to perform online play on the to-be-played file corresponding to the transmission data.

Optionally, the processor 161 may further execute program code of the following steps:

Step 1: The target client-end receives the transmission data from the first server, where the first server is a server configured to provide the online play service to the target client-end; the transmission data is data corresponding to the to-be-played file to be played on the target client-end, and the transmission data is sent to the first server by the instant messaging application by using the second server; the instant messaging application is configured to: obtain the transmission data and obtain the address of the first server, and send, according to the address of the first server, the transmission data to the first server by using the second server; and the second server is a server of the instant messaging application.

Step 2: The target client-end performs online play on the to-be-played file corresponding to the transmission data.

When the integrated unit in the foregoing embodiment is implemented in the form of a software functional unit and sold or used as an independent product, the integrated unit may be stored in a computer-readable storage medium. Based on such an understanding, the technical solutions of the present disclosure essentially, or the part contributing to the existing technology, or all or some of the technical solutions may be represented in a form of a software product. The computer software product is stored in a storage medium and includes several instructions for instructing one or more computer devices (which may be a personal computer, a server, a network device, or the like) to perform all or some of the steps of the methods in the embodiments of the present disclosure.

In the foregoing embodiments of the present invention, the descriptions of embodiments have respective focuses, and for the part that is not described in detail in an embodiment, reference may be made to the relevant description of other embodiments.

In the several embodiments provided in this application, it should be understood that the disclosed client-end may be implemented in other manners. The foregoing described apparatus embodiment is merely an example. For example, the unit division is merely logical function division and may be another division in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and components displayed as units may or may not be physical units, that is, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

The foregoing descriptions are merely preferred implementations of the present disclosure. It should be noted that a person of ordinary skill in the art may make several improvements or polishing without departing from the principle of the present disclosure, and the improvements or polishing shall fall within the protection scope of the present disclosure.

What is claimed is:

1. A data transmission method, comprising:
obtaining, by a first terminal, transmission data by using a first application, the transmission data being data corresponding to a to-be-played file from a file playing application;
displaying, by the first terminal, a list of candidate contacts on a graphical user interface of the first application for sharing the to-be-played file;
in response to a user selection operation directed to a target contact in the list of contacts, obtaining, by the first terminal, an address of a first server by using the first application, the target contact being associated with a second terminal which is an in-vehicle terminal, and the first server being a server configured to provide an online play service to the in-vehicle terminal, wherein the first server is configured to communicate with a second server, the second server being a server of the first application; and the first server is different from a third server that provides service for the file playing application; and
according to the address of the first server, sending, by the first terminal using the first application, the transmission data to the first server by using the second server.

2. The method according to claim 1, wherein:
the transmission data comprises a uniform resource locator (URL) of the to-be-played file; and
the sending, by the first terminal using the first application, the transmission data to the first server by using the second server comprises: sending, by the first application using the second server, the URL to the first server according to the address of the first server.

3. The method according to claim 1, further comprising:
sending, by the first server, the transmission data to the second terminal, and performing, by the second terminal, online play on the to-be-played file.

4. The method according to claim 3, wherein:
the first application is an instant messaging application; and
the online play on the to-be-played file is performed by a media play application or a navigation application installed on the second terminal.

5. The method according to claim 4, wherein:
the instant messaging application is a social networking application having a friend list of friends of a user of the first terminal; and
the second terminal is added to the friend list as a special friend.

6. The method according to claim 5, wherein:
the to-be-played file is shared to the second terminal by the user via sharing the to-be-played file with the special friend of the friend list.

7. The method according to claim 1, further comprising:
receiving, by the second terminal, the transmission data from the first server corresponding to the to-be-played file; and
performing, by the second terminal, online play on the to-be-played file.

8. The method according to claim 7, further comprising:
determining, by the first server, whether a type of the transmission data satisfies a pre-set type, and if the first server determines that the type of the transmission data satisfies the pre-set type, sending the transmission data to the second terminal.

9. The method according to claim 7, wherein the performing, by the second terminal, online play on the to-be-played file comprises:
parsing, by the second terminal, the transmission data, to obtain play resource information of the to-be-played file; and
performing, by the second terminal, online play on the to-be-played file according to the play resource information.

10. The method according to claim 1, wherein the to-be-played file is an audio type file, a video type file, or a navigation type file.

11. The method according to claim 1, wherein a media play application or a navigation application is installed on the second terminal.

12. The method according to claim 1, further comprising:
prior to obtaining the transmission data,
adding, by the first application, the target contact corresponding to the in-vehicle terminal to the list of contacts;
incorporating, by the first application, information of the first server to the target contact, wherein the target contact is a special entity and different from a peer contact in the list of contacts.

13. The method according to claim 12, wherein:
the information of the first server incorporated to the target contact includes: the address of the first server, and capability information and identification information of the in-vehicle terminal.

14. A non-transitory computer-readable storage medium containing computer-executable instructions for, when executed by one or more processors, performing a data transmission method, the method comprising:
obtaining transmission data by using a first application on a first terminal, the transmission data being data corresponding to a to-be-played file from a file playing application;
displaying a list of candidate contacts on a graphical user interface of the first application for sharing the to-be-played file;
in response to a user selection operation directed to a target contact in the list of contacts, obtaining an address of a first server by using the first application, the target contact being associated with a second terminal which is an in-vehicle terminal, and the first server being a server configured to provide an online play service to the in-vehicle terminal, wherein the first server is configured to communicate with a second server, the second server being a server of the first application; and the first server is different from a third server that provides service for the file playing application; and according to the address of the first server, sending, by using the first application, the transmission data to the first server by using the second server.

15. The non-transitory computer-readable storage medium according to claim 14, wherein:

the transmission data comprises a uniform resource locator (URL) of the to-be-played file; and the sending, by using the first application, the transmission data to the first server by using the second server comprises: sending, by the first application using the second server, the URL to the first server according to the address of the first server to cause the first server to send the transmission data to the second terminal, and performing, by the second terminal, online play on the to-be-played file.

16. The non-transitory computer-readable storage medium according to claim 15, wherein:

the first application is an instant messaging application; and the online play on the to-be-played file is performed by a media play application or a navigation application installed on the second terminal.

17. The non-transitory computer-readable storage medium according to claim 16, wherein:

the instant messaging application is a social networking application having a friend list of friends of a user of the first terminal; and the second terminal is added to the friend list as a special friend.

18. The non-transitory computer-readable storage medium according to claim 17, wherein:

the to-be-played file is shared to the second terminal by the user via sharing the to-be-played file with the special friend of the friend list.

* * * * *